United States Patent
Gopal et al.

(10) Patent No.: US 12,043,721 B2
(45) Date of Patent: Jul. 23, 2024

(54) ANTIVIRAL/ANTIMICROBIAL POLYMER COMPOSITIONS, FIBERS, AND PRODUCTS

(71) Applicant: Ascend Performance Materials Operations LLC, Houston, TX (US)

(72) Inventors: Vikram Gopal, Houston, TX (US); Wai-shing Yung, Houston, TX (US); Albert Ortega, Houston, TX (US)

(73) Assignee: Ascend Performance Materials Operations LLC, Houston, TX (US)

(*) Notice: Subject to any disclaimer, the term of this patent is extended or adjusted under 35 U.S.C. 154(b) by 115 days.

(21) Appl. No.: 17/192,491

(22) Filed: Mar. 4, 2021

(65) Prior Publication Data

US 2021/0277234 A1 Sep. 9, 2021

Related U.S. Application Data

(60) Provisional application No. 63/105,051, filed on Oct. 23, 2020, provisional application No. 63/000,717, filed on Mar. 27, 2020, provisional application No. 62/985,091, filed on Mar. 4, 2020.

(51) Int. Cl.

| | |
|---|---|
| C08K 3/08 | (2006.01) |
| A01N 25/10 | (2006.01) |
| A01N 25/34 | (2006.01) |
| A01N 59/16 | (2006.01) |
| A01N 59/20 | (2006.01) |
| A41D 13/11 | (2006.01) |
| B29C 48/00 | (2019.01) |
| B29K 77/00 | (2006.01) |
| B29K 105/00 | (2006.01) |
| C08K 3/02 | (2006.01) |
| C08L 77/06 | (2006.01) |
| D01F 6/60 | (2006.01) |
| D02G 3/04 | (2006.01) |
| D02G 3/44 | (2006.01) |

(52) U.S. Cl.
CPC ............. *C08K 3/08* (2013.01); *A01N 25/10* (2013.01); *A01N 25/34* (2013.01); *A01N 59/16* (2013.01); *A01N 59/20* (2013.01); *A41D 13/1192* (2013.01); *B29C 48/022* (2019.02); *C08L 77/06* (2013.01); *D01F 6/60* (2013.01); *D02G 3/047* (2013.01); *D02G 3/448* (2013.01); *D02G 3/449* (2013.01); *B29K 2077/00* (2013.01); *B29K 2105/0011* (2013.01); *B29K 2995/0077* (2013.01); *B29K 2995/0092* (2013.01); *C08K 2003/026* (2013.01); *C08K 2003/0893* (2013.01); *C08L 2201/00* (2013.01); *C08L 2201/02* (2013.01); *C08L 2201/08* (2013.01); *C08L 2203/12* (2013.01); *D10B 2331/021* (2013.01); *D10B 2401/02* (2013.01); *D10B 2401/13* (2013.01)

(58) Field of Classification Search
None
See application file for complete search history.

(56) References Cited

U.S. PATENT DOCUMENTS

| | | | |
|---|---|---|---|
| 4,701,518 A * | 10/1987 | Osborn | D06M 11/62 528/319 |
| 4,835,019 A | 5/1989 | White et al. | |
| 5,700,742 A | 12/1997 | Payne | |
| 5,929,200 A * | 7/1999 | Pagilagan | C08K 13/00 528/319 |
| 7,169,402 B2 | 1/2007 | Gabbay | |
| 7,520,923 B2 | 4/2009 | Marcoon | |
| 8,865,605 B2 | 10/2014 | Bender et al. | |
| 9,481,800 B2 | 11/2016 | Palza Cordero et al. | |
| 9,808,014 B2 | 11/2017 | Amestica Salazar | |
| 9,888,691 B2 | 2/2018 | Karandikar et al. | |
| 10,132,029 B2 | 11/2018 | Katzenmeier et al. | |
| 10,717,828 B2 | 7/2020 | Gabbay | |
| 10,905,740 B2 | 2/2021 | Petrak et al. | |
| 2006/0182812 A1* | 8/2006 | Ono | A01N 59/16 424/604 |
| 2020/0102673 A1 | 4/2020 | Dong et al. | |

FOREIGN PATENT DOCUMENTS

| | | | |
|---|---|---|---|
| EP | 1270776 A1 | | 1/2003 |
| JP | 2010281027 | * | 12/2010 |
| KR | 20070071771 | * | 7/2007 |
| TW | 201630994 | * | 9/2016 |
| WO | 2020014585 A1 | | 1/2020 |
| WO | 2020122717 A1 | | 6/2020 |

OTHER PUBLICATIONS

Machine translation of TW201630994 (Year: 2016).*
Machine translation of KR20070071771 (Year: 2007).*
Machine translation of JP2010281027 (Year: 2010).*

* cited by examiner

*Primary Examiner* — Shawn Mckinnon
(74) *Attorney, Agent, or Firm* — COZEN O'CONNOR

(57) ABSTRACT

A polymer composition having antimicrobial properties, the composition comprising from 50 wt % to 99.99 wt % of a polymer, from 10 wppm to 900 wppm of zinc, less than 1000 wppm of phosphorus, and less than 10 wppm coupling agent and/or surfactant, wherein zinc is dispersed within the polymer; and wherein fibers formed from the polymer composition demonstrate a *Klebsiella pneumonia* log reduction greater than 0.90, as determined via ISO20743:2013 and/or an *Escherichia coli* log reduction greater than 1.5, as determined via ASTM E3160 (2018).

31 Claims, No Drawings

ANTIVIRAL/ANTIMICROBIAL POLYMER COMPOSITIONS, FIBERS, AND PRODUCTS

CROSS-REFERENCE TO RELATED APPLICATIONS

This application claims priority to U.S. Provisional Application No. 62/985,091, filed Mar. 4, 2020, U.S. Provisional Application No. 63/000,717, filed Mar. 27, 2020, and U.S. Provisional Application No. 63/105,051, filed Oct. 23, 2020, each of which is incorporated herein by reference.

FIELD

The present disclosure relates to polymer compositions, fibers, yarns, and fabrics having (near-permanent) antiviral and antimicrobial properties. In particular, the present disclosure relates to antiviral products, e.g., fibers, fabrics, high-contact products, formed from a polymer composition comprising unique antimicrobial components.

BACKGROUND

There is a growing interest in fabrics having antiviral and/or antimicrobial properties. In an attempt to achieve such properties, conventional techniques have applied a number of treatments or coatings to fibers to impart antimicrobial properties to fabrics. Compounds containing copper, silver, gold, or zinc, either individually or in combination, have been used in these applications-typically in the form of a topical coating treatment-to effectively combat pathogens such as bacteria, mold, mildew, virus, spores, and fungus. These types of antimicrobial fibers and fabrics may be used in many industries including healthcare, hospitality, military, and athletics, among others. However, these coated fibers have not demonstrated adequately permanent antiviral properties. Furthermore, these coated fibers and fabrics have struggled to meet many other requirements of these applications.

For example, in the healthcare and hospitality industries, certain fabrics are required to be sanitary at all times. To comply with these sanitation standards, the fabrics are subject to daily washing and, often times, bleaching. Thus, in many applications repeated cycles of use, washing, or soaking are quite common. Unfortunately, conventional fibers and fabrics have been found to deteriorate and lose antiviral and/or antimicrobial properties during repeated uses and/or wash cycles.

Additionally, many of the conventional antimicrobial fabrics do not demonstrate sufficient antiviral and/or antimicrobial properties, nor do they retain these properties when the fabrics are dyed. Fabrics are often dyed with or in various colors by submerging the fabric in a dye bath. In many cases, however, antimicrobial additives are extracted from the fibers/fabric, e.g., during dyeing operations, which causes the antimicrobial properties to deteriorate. Further, the antimicrobial treatments/coatings that may be extracted from conventional fabrics may have undesired environmental consequences.

As one example of conventional antimicrobial yarns and fabrics, U.S. Pat. No. 6,584,668 discloses durable non-electrically conductive metal treatments applied to yarns and textile fabrics. The durable non-electrically conductive metal treatments are coatings or finishes applied to yarns and textile fabrics. The metal treatments may include silver and/or silver ions, zinc, iron, copper, nickel, cobalt, aluminum, gold, manganese, magnesium, and the like. The metal treatments are applied to the exterior surface of the yarn or fabric as a coating or film.

Some synthetic fibers having antimicrobial fibers are also known in the art. For example, U.S. Pat. No. 4,701,518 discloses an antimicrobial nylon prepared in water with a zinc compound phosphorus compound to form carpet fibers. The process produces nylon fibers for carpets having 18 denier per filament (dpf), and are prepared by conventional melt polymerization. Such carpet fibers typically have average diameters that are well above 30 microns, which are generally unsuitable for next-to-skin applications. Furthermore, the conventional additives added to polymer compositions to impart antimicrobial properties in the synthetic fibers made therefrom have been found to reduce the relative viscosity in the polymer compositions. This reduced relative viscosity produces further difficulty in producing synthetic fibers from the polymer composition, e.g., increased difficulty in extruding the polymer composition.

As another example, US Publication No. 2020/0102673 discloses antimicrobial fibers that include antimicrobial nanoparticles dispersed substantially uniformly in a polymer matrix. Textiles and other materials can be formed from such fibers. The fibers may be formed via a masterbatch process or in a process wherein the antimicrobial nanoparticles, polymeric component, and additive(s) are melt processed together directly. Devices can be at least partially formed from polymer materials that include antimicrobial nanoparticles dispersed substantially uniformly in a polymer matrix.

Also, U.S. Pat. No. 10,201,198 discloses a protective mask with an ultrafine fibrous coating. The ultrafine fibrous coating includes partially gelled submicron fibers interweaved with nanofibers and a biocide encapsulated in, surface-attached onto, blended with, physically trapped, and/or chemically linked to the submicron fibers and nanofibers. In an example, a microfibrous substrate with the coating assembles with other microfibrous substrates to form a protective mask having N95 level of protection and bacteria-killing capability.

Although some references may teach the use of antimicrobial fibers and fabrics, a need exists for antiviral polymer compositions that retain antiviral properties, e.g., have improved antiviral retention rates, and/or resistance to the extraction of antiviral additives therefrom, while also being able to achieve thinner fiber diameters and/or denier.

SUMMARY

In some cases, the present disclosure relates to a polymer composition having antimicrobial properties, the composition comprising (from 50 wt % to 99.99 wt % of) a polymer (a first polymer and a second polymer), e.g., PA6, or PA 6,6, or combinations thereof, (from 10 wppm to 900 wppm of or greater than 200 wppm of) zinc, less than 1000 wppm of phosphorus, and less than 10 wppm coupling agent and/or surfactant. The zinc, e.g., as zinc ions, is dispersed within the polymer. Fibers formed from the polymer composition demonstrate a *Klebsiella pneumonia* log reduction greater than 0.90, as determined via ISO20743:2013 and/or an *Escherichia coli* log reduction greater than 1.5, as determined via ASTM E3160 (2018). The polymer may have an amine end group content less than 55 and/or a relative viscosity less than 75. and may comprise from 600 wppm to 700 wppm of zinc and/or from 275 wppm to 350 wppm of zinc (provided via zinc stearate) and/or less than 250 wppm phosphorus. The polymer may be hydrophilic and/or hygroscopic, and capable of absorbing greater than 1.5 wt % water, based on the total weight of the polymer. The zinc may be provided from a zinc compound comprising zinc oxide, zinc stearate, zinc ammonium adipate, zinc acetate, or zinc pyrithione, or combinations thereof. The composition may be employed to produce fibers or fabric or a medical product or device, wherein the medical product or device is reusable.

In some cases, the disclosure relates to polymer fibers having antimicrobial reduction efficacy, the fibers comprising: (from 50 wt % to 99.99 wt % of) a polymer, (less than 328 wppm or less than 268 wppm of) zinc, and less than 1 wt % of phosphorus, less than 10 wppm coupling agent and/or surfactant. The fibers may demonstrate a *Escherichia coli* log reduction less than 2.82, as determined via ISO20743 (year). The fibers may have an average fiber diameter ranging from 1 micron to 25 microns; and may demonstrate a *Klebsiella pneumonia* log reduction greater than 1.2, as determined via ISO20743: 2013.

In some cases, the disclosure relates to spunbond polymer fibers having antimicrobial properties, the fibers comprising (from 50 wt % to 99.99 wt % of) a polymer, (425 wppm to 600 wppm of) zinc, (5 wppm to 35 wppm of) copper, less than 1 wt % of phosphorus, less than 10 wppm coupling agent and/or surfactant. The fibers may demonstrate a *Klebsiella pneumonia* log reduction greater than 2.7, as determined via ISO20743 (year). The polymer may have a relative viscosity ranging from 5 to 70. The fibers may have an average fiber diameter ranging from 1 micron to 25 microns. The fibers may be employed to produce a mask comprising a spunbond layer comprising the polymer fibers.

In some cases, the disclosure relates to a fabric (optionally a knitted fabric or a greige fabric) comprising polymer fibers having *Klebsiella pneumonia* reduction efficacy, the fibers comprising (from 50 wt % to 99.99 wt % of) a polymer, (from 350 wppm to 600 wppm or from 350 wppm to 550 wppm of) zinc (optionally from zinc ammonium adipate), less than 1 wt % of phosphorus, and less than 10 wppm coupling agent and/or surfactant. The fibers may have a coat weight ranging from 1 gsm to 50 gsm and/or may be produced via a multi-row die and/or may demonstrate a *Klebsiella pneumonia* log reduction greater than 2.15, after scouring, as determined via ISO20743:2013 and/or a *Klebsiella pneumonia* log reduction greater than 3.3, as determined via ISO20743:2013.

In some cases, the disclosure relates to polymer fibers having *Klebsiella pneumonia* reduction efficacy, the fibers comprising (from 50 wt % to 99.99 wt % of) a polymer, (480 wppm to 520 wppm of) zinc, less than 1 wt % of phosphorus, BS less than 10 wppm coupling agent and/or surfactant. The fibers may demonstrate a *Klebsiella pneumonia* log reduction greater than 2.14, as determined via ISO20743:2013).

In some cases, the disclosure relates to a polymer composition having antimicrobial properties, the composition comprising: a polyamide polymer; an olefin polymer; (from 5000 wppm to 20000 wppm of)zinc, less than 1 wt % of phosphorus, and less than 10 wppm coupling agent and/or surfactant. The zinc is dispersed within the polymer. The fibers formed from the polymer composition may demonstrate a *Klebsiella pneumonia* log reduction greater than 1.41, as determined via ISO20743 (year) and/or a *Staphylococcus aureus* log reduction greater than 2.1, as determined via ISO20743 (year).

In some cases, the disclosure relates to a polymer yarn having antimicrobial properties, the yarn comprising fibers comprising: (from 50 wt % to 99.99 wt % of) a polymer, (425 wppm to 600 wppm of) zinc, (1 wppm to 525 wppm of) copper, less than 1 wt % of phosphorus, and less than 10 wppm coupling agent and/or surfactant. The fibers may demonstrate a *Klebsiella pneumonia* log reduction greater than 2.1, as determined via ISO20743 (year). The weight ratio of zinc to copper may be less than 60:1.

DETAILED DESCRIPTION

Introduction

As discussed above, some conventional antiviral (and/or antimicrobial) polymer compositions, fibers and fabrics utilize antiviral (and/or antimicrobial) compounds to inhibit viruses and other pathogens. For example, some fabrics may include antimicrobial additives, e.g., silver, coated or applied as a film on an exterior layer. However, it has been found that these treatments or coatings often present a host of problems. The inventors have found that, in some conventional applications where antiviral additives are components of the fiber, the antiviral additives may extract out of the fibers/fabric during the dyeing process, which adversely affects the antiviral properties of the fiber and detrimentally places the additives into the environment. In addition to this problem, the inventors have discovered that some antiviral additives may negatively impact the relative viscosity of the resultant polymer composition.

Some references, e.g., carpet fiber-related references, have disclosed the use of an antimicrobial nylon prepared in water with a zinc compound and phosphorus compound to form the carpet fibers. These references, however, relate to higher denier levels (for example, greater than 12 dpf) and/or higher fiber diameter (for example, greater than 20 microns) fibers/filaments. These teachings, however are typically not relevant to other types of fibers, e.g., those used in next-to-skin textiles, nonwovens, filters, masks, or other medical devices. Carpet fibers are formed via entirely different, non-analogous processes equipment, which results in entirely different products. In view of these significant differences, the teachings of such carpet fiber references are not typically considered relevant to other types of fibers/filaments. More specifically, in carpet fiber production, formulations having different amounts, e.g., higher amounts, of phosphorus compounds (optionally with zinc compounds) are employed for their ability to increase relative viscosity of the polymer. However, phosphorous compounds are not typically used in other small fiber or nonwoven polymer formulations because the use and the accompanying relative viscosity build might contribute to processability issues. Stated another way, the small fiber equipment and processes cannot process the carpet formulation (with the increased relative viscosity), because it could impede processability and make production difficult if not impossible.

In contrast to carpet formulations and other conventional formulations, the polyamide compositions disclosed herein comprise a unique combination of zinc and/or copper and optionally phosphorus, each preferably in particular amounts, e.g., lower amounts, that retards or eliminates the viscosity build that is associated with conventional carpet fiber formulations (and also provides additional synergistic benefits). As a result, the formulations disclosed herein are surprisingly capable of forming much thinner fibers, e.g., in the form of fibers, yarns, or nonwoven webs, having antimicrobial and/or antiviral (AM/AV) properties, while avoiding the aforementioned processing problems.

Also, although some references directly mix antiviral and/or antimicrobial agents with fibers, leathers, or plastics, such references do not address/solve problems of deterioration of the antiviral properties of the products, e.g., via extraction loss. Still other conventional antiviral fabrics have been found to have insufficient strength for apparel applications, e.g., an inability to withstand significant washing, and are unable to retain antimicrobial properties over the product lifetime.

It has now been discovered that presence of a zinc compound and/or a copper compound, and optionally a phosphorus compound, each preferably in specific amounts in a polymer composition, provides for antiviral fibers and yarns that are able to retain AM/AV compounds (and thus AM/AV properties) during and after washing or dyeing. As a result, a synergistic combination of zinc retention and AM/AV efficacy is surprisingly achieved.

In some instances, it is believed that the use of the disclosed components in the disclosed amounts, e.g., (lower) amounts of zinc such as less than 2000 wppm, provides for a polymer composition (and resultant fibers/fabrics) that have a (fairly uniform) dispersion of the AM/AV compound without the need for other processing aids to achieve this result. In some cases, the polymer compositions comprise little or no content of processing aids such as surfactants and/or coupling agents, to produce a polymer composition having dispersion of the AM/AV compound. In contrast, other known formulations, e.g., those of US Publication No. 2020/0102673, employ much higher metal loadings and require expensive surfactants and or coupling agents to prevent agglomeration and achieve effective dispersion in the polymer. Also, with the superior metal retention, e.g., zinc retention, of the disclosed polymer compositions, initial high concentrations of metal are not required. Conventional formulations do not retain metal nearly as effectively, and as such, must begin with high metal loadings (see above) to compensate for metal lost during dye processing and/or wash testing, which contributes to the aforementioned dispersion problems. With the AM/AV compound levels of the disclosed polymer compositions, the compositions beneficially solve the dispersion problem without the need for additional additives, e.g., surfactants and/or coupling agents.

In addition, it is postulated that the use of the phosphorus compound in the specific amounts may allow the zinc compound (zinc) or copper compound (copper) to be more stably disposed in the polymer matrix and, as such, may retard leaching of the zinc/copper compound from the fibers/yarns/fabrics, e.g., during washing and/or dyeing. Stated another way, the polymer composition may have certain amounts of a zinc/copper compound and a phosphorus compound embedded in the polymer matrix such that the polymer composition maintains a higher relative viscosity and retains antimicrobial properties during and after dyeing. In addition, the use of the phosphorus compound in the specific amounts may work with the zinc/copper to improve the relative viscosity of the polymer matrix.

Utilizing the disclosed concentrations of phosphorus, may contribute to elimination/reduction of problems associated with viscosity build, while still achieving the metal retention benefits.

As a result of the composition of the polymer, the disclosed fibers, yarns, and fabrics made from the polymer compositions advantageously eliminate the need for a topical treatment to make apparel antiviral. The present antiviral fibers and fabrics (as well as other antiviral products produced by the disclosed polymer compositions) have "built-in" antiviral properties. And these properties beneficially will not extract out, e.g., wash away, after dyeing. In addition, the disclosed polymer compositions are able to maintain desired relative viscosity levels, which provides for advantageous processing benefits. Further, the antiviral fibers (or other antiviral product) can maintain colorfastness (a characteristic that relates to a material's resistance to color fading or running) and durability. Unlike conventional antiviral fabrics, the present fibers and fabrics substantially retain their antiviral activity from leaching and extraction after dyeing. Further, the present fibers have significantly lower denier and lower average diameter, which beneficially makes them useful in many end applications, e.g., apparel and filtration, where the thicker, higher denier fibers are unsuitable.

In addition, as a result of the formulations disclosed herein, the disclosed polymer compositions, fibers, and/or fabrics do not need to be (and are not) gelled, which adds complications to processing, e.g., compositional requirements to achieve the gelling and/or process requirements to do the same, as well as the inability to achieve high throughput. Thus, the disclosed polymers, fibers, and/or fabrics provide the additional advantages of not including components necessary for gelling as well as elimination of production steps related to the gelling process.

The inventors have also found that certain hydrophilic substrates may better attract liquid media that carry microbials and/or viruses, e.g., saliva or mucous. The employment of the disclosed AM/AV agents in such substrates, e.g., in the polymer matrices thereof, can be used to more effectively combat the microbials and/or viruses, versus a less hydrophilic substrate.

Thus, it has now been found that particular substrates, e.g., nylons, that are able to contain and retain the antiviral/antimicrobial agents and that have high levels of hydrophilicity and/or hygroscopy, present the synergistic ability to attract such liquid media and to then reduce or inhibit the growth of the microbials and/or viruses that are contained therein.

In some embodiments, specific molar ratios of phosphorus to zinc and/or copper are employed, e.g., wherein the phosphorus to zinc and/or copper molar ratio is at least 0.01:1. Without being bound by theory, by maintaining a particular phosphorus to zinc and/or copper balance, the polymer surprisingly achieves desirable relative viscosity levels, e.g., at least 10, while still maintaining the aforementioned antiviral properties.

The disclosure also relates to a process for making AM/AV fibers (or other antiviral product). The process comprises the steps of providing the polymer composition having antiviral properties, and forming the polymer composition into fibers. It was also beneficially found that providing zinc (via a zinc compound) and/or copper (provided to the composition via a copper compound) and optionally phosphorus (via a phosphorus compound) to the polymer composition during the production process of the fibers, e.g., to the aqueous monomer solution, produces fibers with antiviral agents evenly dispersed throughout the entire fiber. In conventional processes, a silver coating is applied to the outer surface of the fabric to impart antiviral properties to the fabric. However, the silver coating is not dispersed throughout the fabric and is more susceptible to leaching components, e.g., silver, into the environment. Advantageously, the present polymer composition does not give rise to toxicity because it does not elute the antiviral agents, nor does it include any toxic components, e.g., silver. Additionally, antiviral fibers (or other antiviral product) formed the present polymer composition do not require a separate application step since the antiviral agents are permanently bound to the polymer matrix.

Polymer Composition

As noted above, the present disclosure relates to polymer compositions that beneficially exhibit AM/AV properties. In some embodiments, the polymer compositions comprise a polymer, zinc (provided to the composition via a zinc compound), and/or copper (provided to the composition via a copper compound), and/or phosphorus (provided to the composition via a phosphorus compound). For example, the polymer may be present in an amount ranging from 50 wt. % to 99.99 wt. %, e.g., 99.9 wt %; the zinc may be present in an amount ranging from 10 wppm to 20,000 wppm; and the phosphorus may be present in an amount less than 1 wt. %. Additional concentration ranges and limits are disclosed herein. The present disclosure also relates to polymer compositions that comprise a polymer, copper (provided to the composition via a copper compound), and phosphorus (provided to the composition via a phosphorus compound). For example, the polymer may be present in an amount ranging from 50 wt. % to 99.9 wt. %; the copper may be present in an amount ranging from 10 wppm to 20,000 wppm; and the phosphorus may be present in an amount less than 1 wt. %. The polymer compositions may be used to form fibers, and, in addition to improved AM/AV performance, the fibers demonstrate superior zinc/copper extraction rates, e.g., less than 35% zinc/copper extracted, when tested in a dye bath test or a wash test (as described herein). The fibers may demonstrate superior zinc/copper retention rates, when tested in a dye bath test or a wash test (as described herein).

As discussed below, the polymer compositions described herein demonstrate AM/AV properties. Further, the disclosed compositions may be used in the preparation of a variety of products. For example, the polymer compositions described herein may be formed into high-contact products (e.g., products handled by users). The products formed from the polymer compositions similarly demonstrate AM/AV properties. Thus, the disclosed compositions may be used in the preparation of a variety of antiviral products.

Polymer

The polymer composition comprises a polymer, which, in some embodiments, is a polymer suitable for producing fibers and fabrics. In one embodiment, the polymer composition comprises a polymer in an amount ranging from 50 wt. % to 100 wt. %, e.g., from 50 wt. % to 99.99 wt. %, from 50 wt. % to 99.9 wt. %, from 50 wt. % to 99 wt. % from 55 wt. % to 100 wt. %, from 55 wt. % to 99.99 wt. %, from 55 wt. % to 99.9 wt. %, from 55 wt. % to 99 wt. %, from 60 wt. % to 100 wt. %, from 60 wt. % to 99.99 wt. %, from 60 wt. % to 99.9 wt. %, from 60 wt. % to 99 wt. %, from 65 wt. % to 100 wt. %, from 65 wt. % to 99.99 wt. %, from 65 wt. % to 99.9 wt. %, or from 65 wt. % to 99 wt. %. In terms of upper limits, the polymer composition may comprise less than 100 wt. % of the polymer, e.g., less than 99.99 wt. %, less than 99.9 wt. %, or less than 99 wt. %. In terms of lower limits, the polymer composition may comprise greater than 50 wt. % of the polymer, e.g., greater than 55 wt. %, greater than 60 wt. %, or greater than 65 wt. %. In some cases, the composition comprises the zinc and other additives, as discussed herein, and the balance polymer.

The polymer of the polymer composition may vary widely. The polymer may include but is not limited to, a thermoplastic polymer, polyester, nylon, rayon, polyamide 6, polyamide 6,6, polyethylene (PE), polypropylene (PP), polyethylene terephthalate (PET), polyethylene terephthalate glycol (PETG), co-PET, polylactic acid (PLA), and polytrimethylene terephthalate (PTT). In some embodiments, the polymer composition may comprise PET, for its strength, longevity during washing, ability to be made permanent press, and ability to be blended with other fibers. In some embodiments, the polymer may be Nylon 6,6. In some cases, nylon is known to be a stronger fiber than PET and exhibits a non-drip burning characteristic that is beneficial e.g., in military or automotive textile applications, and is more hydrophilic than PET. The polymer used in the present disclosure can be a polyamide, polyether amide, polyether ester or polyether urethane or a mixture thereof.

In some cases, the polymer compositions may comprise polyethylene. Suitable examples of polyethylene include linear low-density polyethylene (LLDPE), low-density polyethylene (LDPE), medium-density polyethylene (MDPE), high-density polyethylene (HDPE), and ultra-high-molecular-weight polyethylene (UHMWPE).

In some cases, the polymer compositions may comprise polycarbonate (PC). For example, the polymer composition may comprise a blend of polycarbonate with other polymers, e.g., a blend of polycarbonate and acrylonitrile butadiene styrene (PC-ABS), a blend of polycarbonate and polyvinyl toluene (PC-PVT), a blend of polycarbonate and polybutylene terephthalate (PC-PBT), a blend of polycarbonate and polyethylene terephthalate (PC-PET), or combinations thereof.

In some cases, the polymer composition may comprise polyamides. Common polyamides include nylons and aramids. For example, the polyamide may comprise PA-4T/4I; PA-4T/6I; PA-5T/5I; PA-6; PA-6,6; PA-6,6/6; long chain polyamide (such as PA-10; PA-12; PA-6,10; PA-6,12, as well as other known long chain variants optionally including aromatic components, e.g., T and I components); PA-6,6/6T; PA-6T/6I; PA-6T/6I/6; PA-6T/6; PA-6T/6I/66; PA-6T/MPMDT (where MPMDT is polyamide based on a mixture of hexamethylene diamine and 2-methylpentamethylene diamine as the diamine component and terephthalic acid as the diacid component); PA-6T/66; PA-6T/610; PA-10T/612; PA-10T/106; PA-6T/612; PA-6T/10T; PA-6T/10I; PA-9T; PA-10T; PA-12T; PA-10T/10I; PA-10T/12; PA-10T/11; PA-6T/9T; PA-6T/12T; PA-6T/10T/6I; PA-6T/6I/6; PA-6T/6I/12; and copolymers, blends, mixtures and/or other combinations thereof. Additional suitable polyamides, additives, and other components are disclosed in U.S. patent application Ser. No. 16/003,528. Such polymers may synergistically work well with the other components of the polymer composition due to the hydrophilic and/or hygroscopic properties thereof.

The polymer compositions surprisingly may benefit from a polymer having high or increased hydrophilicity and/or hygroscopy. In particular, the use of a hydrophilic and/or hygroscopic polymer may increase the antiviral properties of the polymer composition. It is postulated that viruses and/or microbials are carried by liquids like saliva and mucous. Also, it is theorized that a polymer of increased hydrophilicity and/or hygroscopy both may better attract liquid media that carry microbials and/or viruses, e.g., saliva or mucous, and may also absorb more moisture, e.g., from the air, and that the increased moisture content allows the polymer composition and the antiviral/antimicrobial agent to more readily limit, reduce, or inhibit infection and/or pathogenesis of a virus. For example, the moisture may dissolve an outer layer, e.g., capsid, of a virus, exposing the genetic material, e.g., DNA or RNA, of the virus. The exposed genetic material is more susceptible to deactivation by other components of the polymer composition, e.g., the zinc compound, phosphorus compound, and/or copper compound (discussed below). This is one surprising, synergistic results of using polymers having higher levels of hydrophilicity and/or hygroscopy. In contrast, products formed from less hydrophilic and/or hygroscopic polymers, e.g., polypropylene, may not attract the fluids, and may not be as effective.

In some cases, conventional surface modifiers, such as citric acid, are applied to or sprayed on the surface of the polymer compositions (or of articles formed therefrom). By using a hydrophilic and/or hygroscopic polymer, the polymer compositions of the present disclosure may not require any such solubility modifiers.

In some other embodiments however, the products formed from the polymer compositions may be treated, e.g., with citric acid, to make them even more hydrophilic and/or hygroscopic.

In some cases, the hydrophilicity and/or hygroscopy of a polymer may be measured by saturation.

In some cases, the hydrophilicity and/or hygroscopy of a polymer may be measured by the amount of water it can absorb (as a percentage of total weight). In some embodiments, the hydrophilic and/or hygroscopic polymer is capable of absorbing greater than 1.5 wt % water, based on the total weight of the polymer, e.g., greater than 2.0 wt %, greater than 3.0%, greater than 5.0 wt %, or greater than 7.0 wt %. In terms of ranges, the hydrophilic and/or hygroscopic polymer may be capable of absorbing water in an amount ranging from 1.5 wt % to 10.0 wt %, e.g., from 1.5 wt % to 9.0 wt %, from 2.0 wt % to 8 wt %, from 2.0 wt % to 7 w %, of from 2.5 wt % to 7 wt. %. The ability to absorb more moisture allows the polymer compositions to better reduce or inhibit the growth of the microbials and/or viruses that are contained therein (as discussed above).

As noted above, some applications of the polymer compositions described herein surprisingly may benefit from increased hygroscopy. An increase in hygroscopy may be achieved in the selection and/or modification the polymer. In some embodiments, the polymer may be a common polymer, e.g., a common polyamide, which has been modified to increase hygroscopy. In these embodiments, a functional endgroup modification on the polymer may increase hygroscopy. For example, the polymer may be PA-6,6, which has been modified to include a functional endgroup that increases hygroscopy.

In some preferred cases, the polyamide-based, e.g., nylon-based, compounds are utilized as the polymer. It has surprisingly been found that these nylon-based polymers, when utilized with the aforementioned zinc compound, copper compound, and phosphorus compound additives and formed into fabrics, provide the antiviral and/or antimicrobial characteristics. In some cases, it has been found that conventional polymers that utilize polyester polymers harbor and allow to flourish different types of viruses and/or bacteria, as compared to those of nylon. For example, *micrococcus* bacteria have been found to flourish in polyester-based fabrics and produce high odor levels. Thus the use of nylon-based polymers, along with the aforementioned additives, surprisingly has been found to yield fabrics that demonstrate significantly low odor levels as compared to similar fabrics that utilize polyesters.

The polymer composition may, in some embodiments, comprise a combination of polyamides. By combining various polyamides, the final composition may be able to incorporate the desirable properties, e.g., mechanical properties, of each constituent polyamides. For example, in some embodiments, the polyamide comprises a combination of PA-6, PA-6,6, and PA-6,6/6T. In these embodiments, the polyamide may comprise from 1 wt. % to 99 wt. % PA-6, from 30 wt. % to 99 wt. % PA-6,6, and from 1 wt. % to 99 wt. % PA-6,6/6T. In some embodiments, the polyamide comprises one or more of PA-6, PA-6,6, and PA-6,6/6T. In some aspects, the polymer composition comprises 6 wt. % of PA-6 and 94 wt. % of PA-6,6. In some aspects, the polymer composition comprises copolymers or blends of any of the polyamides mentioned herein.

The polymer composition may also comprise polyamides produced through the ring-opening polymerization or polycondensation, including the copolymerization and/or copolycondensation, of lactams. Without being bound by theory, these polyamides may include, for example, those produced from propriolactam, butyrolactam, valerolactam, and caprolactam. For example, in some embodiments, the polyamide is a polymer derived from the polymerization of caprolactam. In those embodiments, the polymer comprises at least 10 wt. % caprolactam, e.g., at least 15 wt. %, at least 20 wt. %, at least 25 wt. %, at least 30 wt. %, at least 35 wt. %, at least 40 wt. %, at least 45 wt. %, at least 50 wt. %, at least 55 wt. %, or at least 60 wt. %. In some embodiments, the polymer includes from 10 wt. % to 60 wt. % of caprolactam, e.g., from 15 wt. % to 55 wt. %, from 20 wt. % to 50 wt. %, from 25 wt. % to 45 wt. %, or from 30 wt. % to 40 wt. %. In some embodiments, the polymer comprises less than 60 wt. % caprolactam, e.g., less than 55 wt. %, less than 50 wt. %, less than 45 wt. %, less than 40 wt. %, less than 35 wt. %, less than 30 wt. %, less than 25 wt. %, less than 20 wt. %, or less than 15 wt. %. Furthermore, the polymer composition may comprise the polyamides produced through the copolymerization of a lactam with a nylon, for example, the product of the copolymerization of a caprolactam with PA-6,6.

In some aspects, the polymer can formed by conventional polymerization of the polymer composition in which an aqueous solution of at least one diamine-carboxylic acid salt is heated to remove water and effect polymerization to form an antiviral nylon. This aqueous solution is preferably a mixture which includes at least one polyamide-forming salt in combination with the specific amounts of a zinc compound, a copper compound, and/or a phosphorus compound described herein to produce a polymer composition. Conventional polyamide salts are formed by reaction of diamines with dicarboxylic acids with the resulting salt providing the monomer. In some embodiments, a preferred polyamide-forming salt is hexamethylenediamine adipate (nylon 6,6 salt) formed by the reaction of equimolar amounts of hexamethylenediamine and adipic acid.

In some embodiments, the polymer compositions (and the fibers/fabrics produced therefrom) advantageously comprise little or no content of processing aids such as surfactants and/or coupling agents (see discussion above). In some cases, the polymer compositions comprise less than 100 wppm surfactant and/or coupling agent, e.g., less than 50 wppm, less than less than 20 wppm, less than 10 wppm, or less than 5 wppm. In terms of ranges, the polymer compositions may comprise from 1 wppb to 100 wppm, e.g., from 1 wppb to 20 wppm, from 1 wppb to 10 wppm, or from 1 wppb to 5 wppm. The disclosed compositions may not employ any surfactant and/or coupling agent at all. There can be no surfactant and/or coupling agent present after processing, which is not the case for conventional formulations that do employ surfactant and/or coupling agents as necessary components. Even though some of these components may burn off during processing, some surfactant and/or coupling agent will remain in the resultant fibers.

Common surfactants include anionic surfactants, cationic surfactants and/or non-ionic surfactants. Specific examples are stearic acid, sodium dodecyl sulfonate surfactants, quaternary ammonium surfactants, amino acid surfactants, betaine surfactants, fatty acid glyceride ester surfactants, fatty acid sorbitan surfactants, lecithin surfactants, and/or Tween™ series surfactants (e.g., polyethoxylated sorbitan ester surfactants, nonionic polyoxyethylene surfactants, etc.).

The inventors have found that the content of amine end groups (AEG) may have a surprising effect on the performance of the polymer compositions, fibers, and fabrics. As one example, the AEGs have been found to improve the ability to dye fibers and/or fabrics. The polymer composition may have an AEG content ranging from 1 µeq/gram to 105 µeq/gram, e.g., from 1 µeq/gram to 75 µeq/gram, from 1 µeq/gram to 55 µeq/gram, from 5 µeq/gram to 50 µeq/gram, or from 15 µeq/gram to 40 µeq/gram. In terms of upper limits, the polymer composition may have an AEG content less than 105 µeq/gram, e.g., less than 100 µeq/gram, less than 90 µeq/gram, less than 75 µeq/gram, less than 55 µeq/gram, less than 50 µeq/gram, less than 45 µeq/gram, less than 40 µeq/gram, less than 35 µeq/gram, less than 30 µeq/gram, or less than 25 µeq/gram. In terms of lower limits, the polymer composition may have an AEG content greater than 1 µeq/gram, e.g., greater than 5 µeq/gram, greater than 10 µeq/gram, greater than 15 µeq/gram, greater than 20 µeq/gram, greater than 25 µeq/gram, greater than 35 µeq/gram, greater than 40 µeq/gram, or greater than 50 µeq/gram.

In some cases, e.g., when a spunbond process is employed, a higher relative viscosity may be employed. In other cases, e.g., when a meltblown process is employed, a lower relative viscosity may be employed. In these cases, the inventors have found that by using particular zinc and/or phosphorus content, along with specific polymer characteristics, unexpected efficiencies can be achieved, while also achieving AM/AV performance. Examples of some specific formulations are provided below.

Zinc Compound

As noted above, the polymer composition includes zinc in a zinc compound and phosphorus in a phosphorus compound, preferably in specific amounts in the polymer composition, to provide the aforementioned structural and antiviral benefits. As used herein, "zinc compound" refers to a compound having at least one zinc molecule or ion (likewise for copper compounds). As used herein, "phosphorus compound" refers to a compound having at least one phosphorus molecule or ion. Zinc content may be indicated by zinc or zinc ion (the same is true for copper). The ranges and limits may be employed for zinc content and for zinc ion content, and for other metal content, e.g., copper content. The calculation of zinc ion content based on zinc or zinc compound can be made by the skilled chemist, and such calculations and adjustments are contemplated.

The inventors have found that the use of specific zinc compounds (and the zinc contained therein) and phosphorus compounds (and the phosphorus contained therein) at specific molar ratios minimizes the negative effects of the zinc compound on the polymer composition. For example, too much zinc compound in the polymer composition can lead to decreased polymer viscosity and inefficiencies in production processes.

The polymer composition may comprise zinc (e.g., in a zinc compound or as zinc ion), e.g., zinc or a zinc compound, dispersed within the polymer composition. In one embodiment, the polymer composition comprises zinc in an amount ranging from 5 wppm to 20,000 wppm, e.g., from 5 wppm to 17,500 wppm, from 5 wppm to 17,000 wppm, from 5 wppm to 16,500 wppm, from 5 wppm to 16,000 wppm, from 5 wppm to 15,500 wppm, from 5 wppm to 15,000 wppm, from 5 wppm to 12,500 wppm, from 5 wppm to 10,000 wppm, from 5 wppm to 5000 wppm, from 5 wppm to 4000 wppm, e.g., from 5 wppm to 3000 wppm, from 5 wppm to 2000 wppm, from 5 wppm to 1000 wppm, from 5 wppm to 500 wppm, from 10 wppm to 20,000 wppm, from 10 wppm to 17,500 wppm, from 10 wppm to 17,000 wppm, from 10 wppm to 16,500 wppm, from 10 wppm to 16,000 wppm, from 10 wppm to 15,500 wppm, from 10 wppm to 15,000 wppm, from 10 wppm to 12,500 wppm, from 10 wppm to 10,000 wppm, from 10 wppm to 5000 wppm, from 10 wppm to 4000 wppm, from 10 wppm to 3000 wppm, from 10 wppm to 2000 wppm, from 10 wppm to 1000 wppm, from 10 wppm to 500 wppm, from 50 wppm to 20,000 wppm, from 50 wppm to 17,500 wppm, from 50 wppm to 17,000 wppm, from 50 wppm to 16,500 wppm, from 50 wppm to 16,000 wppm, from 50 wppm to 15,500 wppm, from 50 wppm to 15,000 wppm, from 50 wppm to 12,500 wppm, from 50 wppm to 10,000 wppm, from 50 wppm to 5000 wppm, from 50 wppm to 4000 wppm, from 50 wppm to 3000 wppm, from 50 wppm to 2000 wppm, from 50 wppm to 1000 wppm, from 50 wppm to 500 wppm, from 100 wppm to 20,000 wppm, from 100 wppm to 17,500 wppm, from 100 wppm to 17,000 wppm, from 100 wppm to 16,500 wppm, from 100 wppm to 16,000 wppm, from 100 wppm to 15,500 wppm, from 100 wppm to 15,000 wppm, from 100 wppm to 12,500 wppm, from 100 wppm to 10,000 wppm, from 100 wppm to 5000 wppm, from 100 wppm to 4000 wppm, from 100 wppm to 3000 wppm, from 100 wppm to 2000 wppm, from 100 wppm to 1000 wppm, from 100 wppm to 500 wppm, from 200 wppm to 20,000 wppm, from 200 wppm to 17,500 wppm, from 200 wppm to 17,000 wppm, from 200 wppm to 16,500 wppm, from 200 wppm to 16,000 wppm, from 200 wppm to 15,500 wppm, from 200 wppm to 15,000 wppm, from 200 wppm to 12,500 wppm, from 200 wppm to 10,000 wppm, from 200 wppm to 5000 wppm, from 200 wppm to 4000 wppm, 5000 wppm to 20000 wppm, from 200 wppm to 3000 wppm, from 200 wppm to 2000 wppm, from 200 wppm to 1000 wppm, from 200 wppm to 500 wppm, from 10 wppm to 900 wppm, from 200 wppm to 900 wppm, from 425 wppm to 600 wppm, from 425 wppm to 525 wppm, from 350 wppm to 600 wppm, from 375 wppm to 600 wppm, from 375 wppm to 525 wppm, from 480 wppm to 600 wppm, from 480 wppm to 525 wppm, from 600 wppm to 750 wppm, or from 600 wppm to 700 wppm.

In terms of lower limits, the polymer composition may comprise greater than 5 wppm of zinc, e.g., greater than 10 wppm, greater than 50 wppm, greater than 100 wppm, greater than 200 wppm, greater than 300 wppm, greater than 350 wppm, greater than 375 wppm, greater than 400 wppm, greater than 425 wppm, greater than 480 wppm, greater than 500 wppm, or greater than 600 wppm.

In terms of upper limits, the polymer composition may comprise less than 20,000 wppm of zinc, e.g., less than 17,500 wppm, less than 17,000 wppm, less than 16,500 wppm, less than 16,000 wppm, less than 15,500 wppm, less than 15,000 wppm, less than 12,500 wppm, less than 10,000 wppm, less than 5000 wppm, less than less than 4000 wppm, less than 3000 wppm, less than 2000 wppm, less than 1000 wppm, less than 500 wppm, less than 400 wppm, less than 330 wppm, less than 300. In some aspects, the zinc compound is embedded in the polymer formed from the polymer composition.

The ranges and limits are applicable to both zinc in elemental or ionic form and to zinc compound). The same is true for other ranges and limits disclosed herein relating to other metals, e.g., copper. For example, the ranges may relate to the amount of zinc ions dispersed in the polymer.

The zinc of the polymer composition is present in or provided via a zinc compound, which may vary widely. The zinc compound may comprise zinc oxide, zinc ammonium adipate, zinc acetate, zinc ammonium carbonate, zinc stearate, zinc phenyl phosphinic acid, or zinc pyrithione, or combinations thereof. In some embodiments, the zinc compound comprises zinc oxide, zinc ammonium adipate, zinc acetate, or zinc pyrithione, or combinations thereof. In some embodiments, the zinc compound comprises zinc oxide, zinc stearate, or zinc ammonium adipate, or combinations thereof. In some aspects, the zinc is provided in the form of zinc oxide. In some aspects, the zinc is not provided via zinc phenyl phosphinate and/or zinc phenyl phosphonate.

The inventors have also found that the polymer compositions surprisingly may benefit from the use of specific zinc compounds. In particular, the use of zinc compounds prone to forming ionic zinc (e.g., $Zn^{2+}$) may increase the antiviral properties of the polymer composition. It is theorized that the ionic zinc disrupts the replicative cycle of the virus. For example, the ionic zinc may interfere with (e.g., inhibit) viral protease or polymerase activity. Further discussion of the effect of ionic zinc on viral activity is found in Velthuis et al., Zn Inhibits Coronavirus and Arterivirus RNA Polymerase Activity In Vitro and Zinc Ionophores Block the Replication of These Viruses in Cell Culture, PLoS Pathogens (November 2010), which is incorporated herein by reference.

The amount of the zinc compound present in the polymer compositions may be discussed in relation to the ionic zinc content. In one embodiment, the polymer composition comprises ionic zinc, e.g., $Zn^{2+}$, in an amount ranging from 1 ppm to 30,000 ppm, e.g., from 1 ppm to 25,000 ppm, from 1 ppm to 20,000 ppm, from 1 ppm to 15,000 ppm, from 1 ppm to 10,000 ppm, from 1 ppm to 5,000 ppm, from 1 ppm to 2,500 ppm, from 50 ppm to 30,000 ppm, from 50 ppm to 25,000 ppm, from 50 ppm to 20,000 ppm, from 50 ppm to 15,000 ppm, from 50 ppm to 10,000 ppm, from 50 ppm to 5,000 ppm, from 50 ppm to 2,500 ppm, from 100 ppm to 30,000 ppm, from 100 ppm to 25,000 ppm, from 100 ppm to 20,000 ppm, from 100 ppm to 15,000 ppm, from 100 ppm to 10,000 ppm, from 100 ppm to 5,000 ppm, from 100 ppm to 2,500 ppm, from 150 ppm to 30,000 ppm, from 150 ppm to 25,000 ppm, from 150 ppm to 20,000 ppm, from 150 ppm to 15,000 ppm, from 150 ppm to 10,000 ppm, from 150 ppm to 5,000 ppm, from 150 ppm to 2,500 ppm, from 250 ppm to 30,000 ppm, from 250 ppm to 25,000 ppm, from 250 ppm to 20,000 ppm, from 250 ppm to 15,000 ppm, from 250 ppm to 10,000 ppm, from 250 ppm to 5,000 ppm, or from 250 ppm to 2,500 ppm. In some cases, the ranges and limits mentioned above for zinc may also be applicable to ionic zinc content.

In some cases, the use of zinc provides for processing and or end use benefits. Other antiviral agents, e.g., copper or silver, may be used, but these often include adverse effects (e.g., on the relative viscosity of the polymer composition, toxicity, and health or environmental risk). In some situations, the zinc does not have adverse effects on the relative viscosity of the polymer composition. Also, the zinc, unlike other antiviral agents, e.g., silver, does not present toxicity issues (and in fact may provide health advantages, such as immune system support). In addition, as noted herein, the use of zinc provides for the reduction or elimination of leaching into other media and/or into the environment. This both prevents the risks associated with introducing zinc into the environment and allows the polymer composition to be reused—zinc provides surprising "green" advantages over conventional, e.g., silver-containing, compositions.

Phosphorus Compound

The polymer composition may comprise phosphorus (in a phosphorus compound), e.g., phosphorus or a phosphorus compound is dispersed within the polymer composition. In one embodiment, the polymer composition comprises phosphorus in an amount ranging from 50 wppm to 10000 wppm, e.g., from 50 wppm to 5000 wppm, from 50 wppm to 2500 wppm, from 50 wppm to 2000 wppm, from 50 wppm to 800 wppm, 100 wppm to 750 wppm, 100 wppm to 1800 wppm, from 100 wppm to 10000 wppm, from 100 wppm to 5000 wppm, from 100 wppm to 2500 wppm, from 100 wppm to 1000 wppm, from 100 wppm to 800 wppm, from 200 wppm to 10000 wppm, 200 wppm to 5000 wppm, from 200 wppm to 2500 wppm, from 200 ppm to 800 wppm, from 300 wppm to 10000 wppm, from 300 wppm to 5000 wppm, from 300 wppm to 2500 wppm, from 300 wppm to 500 wppm, from 500 wppm to 10000 wppm, from 500 wppm to 5000 wppm, or from 500 wppm to 2500 wppm. In terms of lower limits, the polymer composition may comprise greater than 50 wppm of phosphorus, e.g., greater than 75 wppm, greater than 100 wppm, greater than 150 wppm, greater than 200 wppm greater than 300 wppm or greater than 500 wppm. In terms of upper limits, the polymer composition may comprise less than 10000 wppm (or 1 wt. %), e.g., less than 5000 wppm, less than 2500 wppm, less than 2000 wppm, less than 1800 wppm, less than 1500 wppm, less than 1000 wppm, less than 800 wppm, less than 750 wppm, less than 500 wppm, less than 475 wppm, less than 450 wppm, less than 400 wppm, less than 350 wppm, less than 300 wppm, less than 250 wppm, less than 200 wppm, less than 150 wppm, less than 100 wppm, less than 50 wppm, less than 25 wppm, or less than 10 wppm.

In some aspects, the phosphorus or the phosphorus compound is embedded in the polymer formed from the polymer composition. As noted above, because of the overall make-up of the disclosed composition low amounts, if any, phosphorus may be employed, which in some cases may provide for advantageous performance results (see above).

The phosphorus of the polymer composition is present in or provided via a phosphorus compound, which may vary widely. The phosphorus compound may comprise bezene phosphinic acid, diphenylphosphinic acid, sodium phenylphosphinate, phosphorous acid, benzene phosphonic acid, calcium phenylphosphinate, potassium B-pentylphosphinate, methylphosphinic acid, manganese hypophosphite, sodium hypophosphite, monosodium phosphate, hypophosphorous acid, dimethylphosphinic acid, ethylphosphinic acid, diethylphosphinic acid, magnesium ethylphosphinate, triphenyl phosphite, diphenylethyl phosphite, dimethylphenyl phosphite, ethyldiphenyl phosphite, phenylphosphonic acid, methylphosphonic acid, ethylphosphonic acid, potassium phenylphosphonate, sodium methylphosphonate, calcium ethylphosphonate, and combinations thereof. In some embodiments, the phosphorus compound comprises phosphoric acid, benzene phosphinic acid, or benzene phosphonic acid, or combinations thereof. In some embodiments, the phosphorus compound comprises benzene phosphinic acid, phosphorous acid, or manganese hypophosphite, or combinations thereof. In some aspects, the phosphorus compound may comprise benzene phosphinic acid.

In one embodiment, the molar ratio of the phosphorus to the zinc is greater than 0.01:1, e.g., greater than 0.05:1, greater than 0.1:1, greater than 0.15:1, greater than 0.25:1, greater than 0.5:1, or greater than 0.75:1. In terms of ranges, the molar ratio of the phosphorus to the zinc in the polymer composition may range from 0.01:1 to 15:1, e.g., from 0.05:1 to 10:1, from 0.1:1 to 9:1, from 0.15:1 to 8:1, from 0.25:1 to 7:1, from 0.5:1 to 6:1, from 0.75:1 to 5:1 from 0.5:1 to 4:1, or from 0.5:1 to 3:1. In terms of upper limits, the molar ratio of zinc to phosphorus in the polymer composition may be less than 15:1, e.g., less than 10:1, less than 9:1, less than 8:1, less than 7:1, less than 6:1, less than 5:1, less than 4:1, or less than 3:1. In some cases, phosphorus is bound in the polymer matrix along with zinc.

In one embodiment, the weight ratio of zinc to phosphorus in the polyamide composition may be greater than 1.3:1, e.g., greater than 1.4:1, greater than 1.5:1, greater than 1.6:1, greater than 1.7:1, greater than 1.8:1, or greater than 2:1. In terms of ranges, the weight ratio of zinc to phosphorus in the polyamide composition may range from 1.3:1 to 30:1, e.g., from 1.4:1 to 25:1, from 1.5:1 to 20:1, from 1.6:1 to 15:1, from 1.8:1 to 10:1, from 2:1 to 8:1, from 3:1 to 7:1, or from 4:1 to 6:1. In terms of upper limits, the weight ratio of zinc to phosphorus in the polyamide composition may be less than 30:1, e.g., less than 28:1, less than 26:1, less than 24:1, less than 22:1, less than 20:1, or less than 15:1. In some aspects, there is no phosphorus in the polyamide composition. In other aspects, a very low amount of phosphorus is present. In some cases, phosphorus is held in the polymer matrix along with zinc.

In one embodiment, the weight ratio of zinc to phosphorus in the polyamide composition may be less than 0.64:1, e.g., less than 0.62:1, less than 0.6:1, e.g., less than 0.5:1, less than 0.45:1, less than 0.4:1, less than 0.3:1, or less than 0.25:1. In terms of ranges, the weight ratio of zinc to phosphorus in the polyamide composition may range from 0.001:1 to 0.64:1, e.g., from 0.01:1 to 0.6:1, from 0.05:1 to 0.5:1, from 0.1:1 to 0.45:1, from 0.2:1 to 0.4:1, from 0.25:1 to 0.35:1, or from 0.2:1 to 0.3:1. In terms of lower limits, the weight ratio of zinc to phosphorus in the polyamide composition may be greater than 0.001:1, e.g., greater than 0.005:1, greater than 0.01:1, greater than 0.05:1, greater than 0.1:1, greater than 0.15:1, or greater than 0.2:1.

Advantageously, it has been discovered that adding the above identified zinc compounds and phosphorus compounds may result in a beneficial relative viscosity (RV) of the polymer composition. In some embodiments, the RV of the polymer composition ranges from 5 to 80, e.g., from 5 to 70, from 10 to 70, from 15 to 65, from 20 to 60, from 30 to 50, from 10 to 35, from 10 to 20, from 60 to 70, from 50 to 80, from 40 to 50, from 30 to 60, from 5 to 30, or from 15 to 32. In terms of lower limits, the RV of the polymer composition may be greater than 5, e.g., greater than 10, greater than 15, greater than 20, greater than 25, greater than 27.5, or greater than 30. In terms of upper limits, the RV of the polymer composition may be less than 70, e.g., less than 65, less than 60, less than 50, less than 40, or less than 35.

To calculate RV, a polymer may be dissolved in a solvent (usually formic or sulfuric acid), the viscosity is measured, then the viscosity is compared to the viscosity of the pure solvent. This give a unitless measurement. Solid materials, as well as liquids, may have a specific RV. The fibers/fabrics produced from the polymer compositions may have the aforementioned relative viscosities, as well.

It has been determined that a specific amount of the zinc compound and the phosphorus compound can be mixed in a polymer composition, e.g., polyamide composition, in finely divided form, such as in the form of granules, flakes and the like, to provide a polymer composition that can be subsequently formed, e.g., extruded, molded or otherwise drawn, into various products (e.g., high-contact products, surface layers of high-contact products) by conventional methods to produce products having substantially improved antimicrobial activity. The zinc and phosphorus are employed in the polymer composition in the aforementioned amounts to provide a fiber with improved antimicrobial activity retention (near-permanent).

Copper Compound

As noted above, the polymer composition, in some embodiments, includes copper (provided via a copper compound). As used herein, "copper compound" refers to a compound having at least one copper molecule or ion.

In some cases, the copper compound may improve, e.g., enhance the antiviral properties of the polymer composition. In some cases, the copper compound may affect other characteristics of the polymer composition, e.g., antimicrobial activity or physical characteristics.

The polymer composition may comprise copper (e.g., in a copper compound), e.g., copper or a copper compound, dispersed within the polymer composition. In one embodiment, the polymer composition comprises copper in an amount ranging from 5 wppm to 20,000 wppm, e.g., from 5 wppm to 17,500 wppm, from 5 wppm to 17,000 wppm, from 5 wppm to 16,500 wppm, from 5 wppm to 16,000 wppm, from 5 wppm to 15,500 wppm, from 5 wppm to 15,000 wppm, from 5 wppm to 12,500 wppm, from 5 wppm to 10,000 wppm, from 5 wppm to 5000 wppm, from 5 wppm to 4000 wppm, e.g., from 5 wppm to 3000 wppm, from 5 wppm to 2000 wppm, from 5 wppm to 1000 wppm, from 5 wppm to 500 wppm, from 5 wppm to 100 wppm, from 5 wppm to 50 wppm, from 5 wppm to 35 wppm, from 10 wppm to 20,000 wppm, from 10 wppm to 17,500 wppm, from 10 wppm to 17,000 wppm, from 10 wppm to 16,500 wppm, from 10 wppm to 16,000 wppm, from 10 wppm to 15,500 wppm, from 10 wppm to 15,000 wppm, from 10 wppm to 12,500 wppm, from 10 wppm to 10,000 wppm, from 10 wppm to 5000 wppm, from 10 wppm to 4000 wppm, from 10 wppm to 3000 wppm, from 10 wppm to 2000 wppm, from 10 wppm to 1000 wppm, from 10 wppm to 500 wppm, from 50 wppm to 20,000 wppm, from 50 wppm to 17,500 wppm, from 50 wppm to 17,000 wppm, from 50 wppm to 16,500 wppm, from 50 wppm to 16,000 wppm, from 50 wppm to 15,500 wppm, from 50 wppm to 15,000 wppm, from 50 wppm to 12,500 wppm, from 50 wppm to 10,000 wppm, from 50 wppm to 5000 wppm, from 50 wppm to 4000 wppm, from 50 wppm to 3000 wppm, from 50 wppm to 2000 wppm, from 50 wppm to 1000 wppm, from 50 wppm to 500 wppm, from 100 wppm to 20,000 wppm, from 100 wppm to 17,500 wppm, from 100 wppm to 17,000 wppm, from 100 wppm to 16,500 wppm, from 100 wppm to 16,000 wppm, from 100 wppm to 15,500 wppm, from 100 wppm to 15,000 wppm, from 100 wppm to 12,500 wppm, from 100 wppm to 10,000 wppm, from 100 wppm to 5000 wppm, from 100 wppm to 4000 wppm, from 100 wppm to 3000 wppm, from 100 wppm to 2000 wppm, from 100 wppm to 1000 wppm, from 100 wppm to 500 wppm, from 200 wppm to 20,000 wppm, from 200 wppm to 17,500 wppm, from 200 wppm to 17,000 wppm, from 200 wppm to 16,500 wppm, from 200 wppm to 16,000 wppm, from 200 wppm to 15,500 wppm, from 200 wppm to 15,000 wppm, from 200 wppm to 12,500 wppm, from 200 wppm to 10,000 wppm, from 200 wppm to 5000 wppm, from 200 wppm to 4000 wppm, from 200 wppm to 3000 wppm, from 200 wppm to 2000 wppm, from 200 wppm to 1000 wppm, or from 200 wppm to 500 wppm.

In terms of lower limits, the polymer composition may comprise greater than 5 wppm of copper, e.g., greater than 10 wppm, greater than 50 wppm, greater than 100 wppm, greater than 200 wppm, or greater than 300 wppm. In terms of upper limits, the polymer composition may comprise less than 20,000 wppm of copper, e.g., less than 17,500 wppm, less than 17,000 wppm, less than 16,500 wppm, less than 16,000 wppm, less than 15,500 wppm, less than 15,000 wppm, less than 12,500 wppm, less than 10,000 wppm, less than 5000 wppm, less than less than 4000 wppm, less than 3000 wppm, less than 2000 wppm, less than 1000 wppm, less than 500 wppm less than 100 wppm, less than 50 wppm, less than 35 wppm. In some aspects, the copper compound is embedded in the polymer formed from the polymer composition.

The composition of the copper compound is not particularly limited. Suitable copper compounds include copper iodide, copper bromide, copper chloride, copper fluoride, copper oxide, copper stearate, copper ammonium adipate, copper acetate, or copper pyrithione, or combinations thereof. The copper compound may comprise copper oxide, copper ammonium adipate, copper acetate, copper ammonium carbonate, copper stearate, copper phenyl phosphinic acid, or copper pyrithione, or combinations thereof. In some embodiments, the copper compound comprises copper oxide, copper ammonium adipate, copper acetate, or copper pyrithione, or combinations thereof. In some embodiments, the copper compound comprises copper oxide, copper stearate, or copper ammonium adipate, or combinations thereof. In some aspects, the copper is provided in the form of copper oxide. In some aspects, the copper is not provided via copper phenyl phosphinate and/or copper phenyl phosphonate.

In some cases, the polymer composition includes silver (optionally provided via a silver compound). As used herein, "silver compound" refers to a compound having at least one silver molecule or ion. The silver may be in ionic form. The ranges and limits for silver may be similar to the ranges and limits for copper (discussed above).

In one embodiment, the molar ratio of the copper to the zinc is greater than 0.01:1, e.g., greater than 0.05:1, greater than 0.1:1, greater than 0.15:1, greater than 0.25:1, greater than 0.5:1, or greater than 0.75:1. In terms of ranges, the molar ratio of the copper to the zinc in the polymer composition may range from 0.01:1 to 15:1, e.g., from 0.05:1 to 10:1, from 0.1:1 to 9:1, from 0.15:1 to 8:1, from 0.25:1 to 7:1, from 0.5:1 to 6:1, from 0.75:1 to 5:1 from 0.5:1 to 4:1, or from 0.5:1 to 3:1. In terms of upper limits, the molar ratio of zinc to copper in the polymer composition may be less than 15:1, e.g., less than 10:1, less than 9:1, less than 8:1, less than 7:1, less than 6:1, less than 5:1, less than 4:1, or less than 3:1. In some cases, copper is bound in the polymer matrix along with zinc.

In some embodiments, the use of cuprous ammonium adipate has been found to be particularly effective in activating copper ions into the polymer matrix. Similarly, the use of silver ammonium adipate has been found to be particularly effective in activating silver ions into the polymer matrix. It is found that dissolving copper (I) or copper (II) compounds in ammonium adipate is particularly efficient at generating copper (I) or copper (II) ions. The same is true for dissolving Ag (I) or Ag (III) compounds in ammonium adipate to generate Ag1+ or Ag3+ ions.

Antiviral Activity

The polymer compositions described herein exhibit antiviral properties, e.g., antiviral activity. Furthermore, the fibers, fabrics, nonwoven polymer structures, and other products formed from the polymer compositions may also exhibit antiviral properties. In particular, by utilizing a polymer composition having the aforementioned zinc, copper, silver and/or phosphorus compounds in the disclosed concentrations, a polymer composition exhibiting antiviral properties can be prepared.

In some embodiments, the polymer compositions, and the products formed therefrom, exhibit permanent, e.g., near permanent, antiviral properties. Said another way, the antiviral properties of the polymer composition last for a prolonged period of time, e.g., longer than one or more day, longer than one or more week, longer than one or more month, or longer than one or more years.

The antiviral properties may include any antiviral effect. In some embodiments, for example, the antiviral properties of the polymer composition include limiting, reducing, or inhibiting infection of a virus. In some embodiments, the antiviral properties of the polymer composition include limiting, reducing, or inhibiting pathogenesis of a virus. In some cases, the polymer composition may limit, reduce, or inhibit both infection and pathogenesis of a virus.

The virus affected by the antiviral properties of the polymer composition is not particularly limited. In some embodiments, for example, the virus is an adenovirus, a herpesvirus, an ebolavirus, a poxvirus, a rhinovirus, a coxsackievirus, an arterivirus, an enterovirus, a morbillivirus, a coronavirus, an influenza A virus, an avian influenza virus, a swine-origin influenza virus, or an equine influence virus. In some embodiments, the antiviral properties include limiting, reducing, or inhibiting the infection or pathogenesis of one of virus, e.g., a virus from the above list. In some embodiments, the antiviral properties include limiting, reducing, or inhibiting the infection or pathogenesis of multiple viruses, e.g., a combination of two or more viruses from the above list.

In some cases, the virus is a coronavirus, e.g., severe acute respiratory syndrome coronavirus (SARS-CoV), Middle East respiratory syndrome coronavirus (MERS-CoV), or severe acute respiratory syndrome coronavirus 2 (SARS-CoV-2) (e.g., the coronavirus that causes COVID-19). In some cases, the virus is structurally related to a coronavirus.

In some cases, the virus is an influenza virus, such as an influenza A virus, an influenza B virus, an influenza C virus, or an influenza D virus, or a structurally related virus. In some cases, the virus is identified by an influenza A virus subtype, e.g., H1N1, H1N2, H2N2, H2N3, H3N1, H3N2, H3N8, H5N1, H5N2, H5N3, H5N6, H5N8, H5N9, H6N1, H7N1, H7N4, H7N7, H7N9, H9N2, or H10N7.

In some cases, the virus is a the virus is a bacteriophage, such as a linear or circular single-stranded DNA virus (e.g., phi X 174 (sometimes referred to as ΦX174)), a linear or circular double-stranded DNA, a linear or circular single-stranded RNA, or a linear or circular double-stranded RNA. In some cases, the antiviral properties of the polymer composition may be measured by testing using a bacteriophage, e.g., phi X 174.

In some cases, the virus is an ebolavirus, e.g., Bundibugyo ebolavirus (BDBV), Reston ebolavirus (RESTV), Sudan ebolavirus (SUDV), Tai Forest ebolavirus (TAFV), or Zaire ebolavirus (EBOV). In some cases, the virus is structurally related to an ebolavirus.

The antiviral activity may be measured by a variety of conventional methods. For example, AATCC $T_M100$ may be utilized to assess the antiviral activity. In one embodiment, the polymer composition, e.g., a fiber, yarn, fabric, and/or nonwoven polymer structure formed from the polymer composition inhibits the pathogenesis (e.g., growth) of a virus in an amount ranging from 60% to 100%, e.g., from 60% to 99.999999%, from 60% to 99.99999%, from 60% to 99.9999%, from 60% to 99.999% from 60% to 99.999%, from 60% to 99.99%, from 60% to 99.9%, from 60% to 99%, from 60% to 98%, from 60% to 95%, from 65% to 99.999999%, from 65% to 99.99999%, from 65% to 99.9999%, from 65% to 99.999% from 65% to 99.999%, from 65% to 100%, from 65% to 990.99%, from 65% to 99.9%, from 65% to 99%, from 65% to 98%, from 65% to 95%, from 70% to 100%, from 70% to 990.999999%, from 70% to 990.99999%, from 70% to 99.9999%, from 70% to 99.999% from 70% to 99.999%, from 70% to 99.99%, from 70% to 99.9%, from 70% to 99%, from 70% to 98%, from 70% to 95%, from 75% to 100%, from 75% to 99.99%, from 75% to 99.9%, from 75% to 99.999999%, from 75% to 99.99999%, from 75% to 99.9999%, from 75% to 99.999% from 75% to 99.999%, from 75% to 99%, from 75% to 98%, from 75% to 95%, %, from 80% to 99.999999%, from 80% to 99.99999%, from 80% to 99.9999%, from 80% to 99.999% from 80% to 99.999%, from 80% to 100%, from 80% to 99.99%, from 80% to 99.9%, from 80% to 99%, from 80% to 98%, or from 80% to 95%. In terms of lower limits, a fiber formed from the polymer composition may inhibit greater than 60% of pathogenesis of the virus, e.g., greater than 65%, greater than 70%, greater than 75%, greater than 80%, greater than 85%, greater than 90%, greater than 95%, greater than 98%, greater than 99%, greater than 99.9%, greater than 99.99%, greater than 99.999%, greater than 99.9999%, greater than 99.99999%, or greater than 99.999999%.

In some cases, the efficacy may be measured in term of log reduction. For example, the composition/fibers/fabrics may demonstrate a virus log reduction greater than 1.0, as determined via ISO 18184 (2019), e.g., greater than 1.5, greater than 1.7, greater than 1.9, greater than 2.0, greater, than 3.0, greater than 4.0, or greater than 5.0.

Antimicrobial Activity

In some embodiments, the polymer compositions, and the products formed therefrom, may also exhibit antimicrobial activity. In some cases, the antimicrobial activity may be the result of an additional antimicrobial additive, as described below, or a result of the polymer composition itself. In some embodiments, the polymer compositions, and the products formed therefrom, exhibit permanent, e.g., near permanent, antimicrobial properties. Said another way, the antimicrobial properties of the polymer composition last for a prolonged period of time, e.g., longer than one or more day, longer than one or more week, longer than one or more month, or longer than one or more years.

The antimicrobial properties may include any antimicrobial effect. In some embodiments, for example, the antimicrobial properties of the polymer composition include limiting, reducing, or inhibiting infection of a microbe, e.g., a bacterium or bacteria. In some embodiments, the antimicrobial properties of the polymer composition include limiting, reducing, or inhibiting growth and/or killing a bacterium. In some cases, the polymer composition may limit, reduce, or inhibit both infection and growth of a bacterium.

The bacterium or bacteria affected by the antiviral properties of the polymer composition is not particularly limited. In some embodiments, for example, the bacterium is a *Streptococcus* bacterium (e.g., *Streptococcus pneumonia, Streptococcus pyogenes*), a *Staphylococcus* bacterium (e.g., *Staphylococcus aureus* (*S. aureus*), Methicillin-resistant *Staphylococcus aureus* (MRSA)), a *Peptostreptococcus* bacteria (e.g., *Peptostreptococcus anaerobius, Peptostreptococcus asaccharolyticus*), or a *Mycobacterium* bacterium, (e.g., *Mycobacterium tuberculosis*), a *Mycoplasma* bacteria (e.g., *Mycoplasma adleri, Mycoplasma* agalactiae, *Mycoplasma* agassizii, *Mycoplasma* amphoriforme, *Mycoplasma* fermentans, *Mycoplasma* genitalium, *Mycoplasma* haemofelis, *Mycoplasma* hominis, *Mycoplasma* hyopneumoniae, *Mycoplasma* hyorhinis, *Mycoplasma* pneumoniae). In some embodiments, the antiviral properties include limiting, reducing, or inhibiting the infection or pathogenesis of multiple bacteria, e.g., a combination of two or more bacteria from the above list.

The antimicrobial activity may be measured by the standard procedure defined by ISO 20743:2013. This procedure measures antimicrobial activity by determining the percentage of a given bacterium or bacteria, e.g. *S. aureus*, inhibited by a tested fiber. In one embodiment, fibers formed from the polymer composition inhibit the growth (growth reduction) of *Staphylococcus Aureus* in an amount ranging from 60% to 100%, e.g., from 60% to 99.9999990%, from 60% to 99.99999%, from 60% to 99.9999%, from 60% to 99.999% from 60% to 99.999%, from 60% to 99.99%, from 60% to 99.9%, from 60% to 99%, from 60% to 98%, from 60% to 95%, from 65% to 99.999999%, from 65% to 99.99999%, from 65% to 99.9999%, from 65% to 99.999% from 65% to 99.999%, from 65% to 100%, from 65% to 99.99%, from 65% to 99.9%, from 65% to 99%, from 65% to 98%, from 65% to 95%, from 70% to 100%, from 70% to 99.999999%, from 70% to 99.99999%, from 70% to 99.9999%, from 70% to 99.999% from 70% to 99.999%, from 70% to 99.99%, from 70% to 99.9%, from 70% to 99%, from 70% to 98%, from 70% to 95%, from 75% to 100%, from 75% to 990.99%, from 75% to 99.9%, from 75% to 99.999999%, from 75% to 99.99999%, from 75% to 99.9999%, from 75% to 99.999% from 75% to 99.999%, from 75% to 99%, from 75% to 98%, from 75% to 95%, %, from 80% to 99.999999%, from 80% to 99.99999%, from 80% to 99.9999%, from 80% to 990.999% from 80% to 990.999%, from 80% to 100%, from 80% to 990.99%, from 80% to 99.9%, from 80% to 99%, from 80% to 98%, or from 80% to 95%. In terms of lower limits, a fiber formed from the polymer composition may inhibit greater than 60% growth of *S. aureus*, e.g., greater than 65%, greater than 70%, greater than 75%, greater than 80%, greater than 85%, greater than 90%, greater than 95%, greater than 98%, greater than 99%, greater than 99.9%, greater than 99.99%, greater than 99.999%, greater than 99.9999%, greater than 99.99999%, or greater than 99.999999%.

In some embodiments, the antiviral fibers (or the yarns or fabrics made therefrom) inhibit/reduce Staph *Aureus* activity, as measured by ISO 20743:2013, by greater than 85%, e.g., greater than 86%, greater than 89%, greater than 90%, greater than 92%, greater than 95%, greater than 97%, greater than 98%, greater than 99%, greater than 99.5%, greater than 99.9%, greater than 99.99%, greater than 99.999%, greater than 99.9999%, greater than 99.99999%, or greater than 99.999999%.

In some embodiments, the antiviral fibers (or the yarns or fabrics made therefrom) inhibit/reduce Staph *Aureus* activity (colony forming units per milliliter), as measured by ASTM E35.15 WK45351, where the yarn may be "as spun." The test may be modified to employ a single specimen (1.5 grams), 15 ml neutralizer. In such cases, the antiviral fibers (or the yarns or fabrics made therefrom) inhibit/reduce Staph *Aureus* activity by greater than 13%, e.g., greater than 25%, greater than 50%, greater than 75%, greater than 80%, greater than 85%, greater than 90%, or greater than 92%.

In some embodiments, the antiviral fibers (or the yarns or fabrics made therefrom) inhibit/reduce Staph *Aureus* activity (colony forming units per milliliter), as measured by ASTM E35.15 WK45351, where the yarn may be spun into yarn, extracted with acetone, and then extracted using boiling water for one hour. In such cases, the antiviral fibers (or the yarns or fabrics made therefrom) inhibit/reduce Staph *Aureus* activity by greater than 75%, e.g., greater than 80%, greater than 85%, greater than 90%, greater than 95%, greater than 97%, greater than 98%, greater than 99%, greater than 99.9%, greater than 99.99%, greater than 99.999%, greater than 99.9999%, greater than 99.99999%, or greater than 99.999999%.

In some embodiments, the antiviral fibers (or other antiviral products) inhibit/reduce Staph *Aureus* activity (colony forming units per milliliter), as measured by ASTM E2149, where the yarn may be "as spun." The test may be modified to employ a single specimen (1.5 grams), 20 ml inoculum, an 8 hour incubation time. In such cases, the antiviral fibers (or other antiviral products) inhibit/reduce Staph *Aureus* activity by greater than 50%, e.g., greater than 75%, greater than 85%, greater than 90%, greater than 95%, greater than 97%, greater than 97.5%, greater than 97.8%, greater than 98%, greater than 99%, greater than 99.9%, greater than 99.99%, greater than 99.999%, greater than 99.9999%, greater than 99.99999%, or greater than 99.999999%.

In some embodiments, the antiviral fibers (or other antiviral products) inhibit/reduce Staph *Aureus* activity (colony forming units per milliliter), as measured by ASTM E2149, where the fibers may be spun into yarn, extracted with acetone, and then extracted using boiling water for one hour. The test may be modified to employ a single specimen (1.5 grams), 20 ml inoculum, an 8 hour incubation time. In such cases, the antiviral fibers (or other antiviral products) inhibit/reduce Staph *Aureus* activity by greater than 50%, e.g., greater than 55%, greater than 60%, greater than 63%, greater than 75%, greater than 80%, greater than 85%, greater than 90%, greater than 92%, greater than 95%, greater than 97%, greater than 98%, greater than 99%, greater than 99.9%, greater than 99.99%, greater than 99.999%, greater than 99.9999%, greater than 99.99999%, or greater than 99.999999%.

Efficacy may be characterized in terms of log reduction. In terms of Staph *Aureus* log reduction, the composition/fibers/fabrics may be determined via ISO 20743:2013 and may demonstrate a microbial log reduction greater than 0.8, e.g., greater than 1.0, greater than 1.5. greater than 2.0, greater than 2.5, greater than 3.0, greater than 4.0, greater than 5.0, or greater than 6.0.

In terms of Staph *Aureus* log reduction, the composition/fibers/fabrics may be determined via ASTM 3160 (2018) and may demonstrate a microbial log reduction greater than 0.6, e.g., greater than 0.8, greater than 1.0, greater than 1.5. greater than 2.0, greater than 2.5, greater than 3.0, greater than 4.0, greater than 5.0, or greater than 6.0.

In terms of Staph *Aureus* log reduction, the composition/fibers/fabrics may be determined via AATC 100 (2018) and may demonstrate a microbial log reduction greater than 3.0, e.g., greater than 3.5, greater than 4.0. greater than 5.5, or greater than 6.0.

The antimicrobial activity of a fiber (or other products) formed from the polymer composition may also be measured by determining the percentage of another bacterium or bacteria, e.g. *Klebsiella pneumoniae*, inhibited by a tested fiber. In one embodiment, a fiber formed from the polymer composition inhibits the growth (growth reduction) of *Klebsiella pneumoniae* in an amount ranging from 60% to 100%, e.g., from 60% to 99.999999%, from 60% to 99.99999%, from 60% to 99.9999%, from 60% to 99.999% from 60% to 99.999%, from 60% to 99.99%, from 60% to 99.9%, from 60% to 99%, from 60% to 98%, from 60% to 95%, from 65% to 100%, from 65% to 99.999999%, from 65% to 99.99999%, from 65% to 99.9999%, from 65% to 99.999% from 65% to 99.999%, from 65% to 99.99%, from 65% to 99.9%, from 65% to 99%, from 65% to 98%, from 65% to 95%, from 70% to 100%, from 70% to 99.9999990%, from 70% to 99.99999%, from 70% to 9999%, from 70% to 99.999% from 70% to 99.999%, from 70% to 99.99%, from 70% to 99.9%, from 70% to 99%, from 70% to 98%, from 70% to 95%, from 75% to 100%, from 75% to 990.999999%, from 75% to 99.999990%, from 75% to 99.9999%, from 75% to 99.999% from 75% to 99.999%, from 75% to 99.99%, from 75% to 99.9%, from 75% to 99%, from 75% to 98%, from 75% to 95%, %, from 80% to 100%, from 80% to 99.999999%, from 80% to 99.99999%, from 80% to 99.9999%, from 80% to 99.999% from 80% to 99.999%, from 80% to 99.99%, from 80% to 99.9%, from 80% to 99%, from 80% to 98%, or from 80% to 95%. In terms of upper limits, a fiber formed from the polymer composition may inhibit less than 100% growth of *Klebsiella pneumoniae*, e.g., less than 99.99%, less than 99.9%, less than 99%, less than 98%, or less than 95%. In terms of lower limits, a fiber formed from the polymer composition may inhibit greater than 60% growth of *Klebsiella pneumoniae*, e.g., greater than 65%, greater than 70%, greater than 75%, or greater than 80%, greater than 85%, greater than 90%, greater than 95%, greater than 99%, greater than 99.9%, greater than 99.99%, greater than 99.999%, greater than 99.9999%, greater than 99.99999%, or greater than 99.999999%.

In some embodiments, antiviral fibers formed from the polymer composition inhibit or reduce *Klebsiella pneumoniae* activity. The antiviral fibers (or other antiviral products) inhibit/reduce *Klebsiella pneumoniae* activity, as measured by ISO 20743:2013, by greater than 76.1%, e.g., greater than 77%, greater than 80%, greater than 85%, greater than 90%, greater than 92%, greater than 95%, greater than 97%, greater than 98%, greater than 99%, greater than 99.5%, greater than 99.9%, greater than 99.99%, greater than 99.999%, greater than 99.9999%, greater than 99.99999%, or greater than 99.999999%.

*Escherichia coli* and/or *Klebsiella pneumoniae* efficacy may also be determined using the aforementioned tests. In some embodiments, a product formed from the polymer composition inhibits the growth (growth reduction) of *Escherichia co/i* and/or *Klebsiella pneumoniae*, as measured by the test mentioned above. The ranges and limits for Staph *Aureus* are applicable to *Escherichia coli* and/or *Klebsiella pneumoniae* as well.

In terms of *Klebsiella pneumoniae* log reduction, the composition/fibers/fabrics may be determined via ISO 20743:2013 and may demonstrate a microbial log reduction greater than 0.8, e.g., greater than 0.9, greater than 1.0, greater than 1.2, greater than 1.4, greater than 1.5. greater than 2.0, greater than 2.15, greater than 2.5, greater than 2.7, greater than 3.0, greater than 3.3, greater than 4.0, greater than 5.0, or greater than 6.0.

In terms of *Escherichia coli* log reduction, the composition/fibers/fabrics may be determined via ASTM 3160 (2018) and may demonstrate a microbial log reduction greater than 1.5, e.g., greater than 2.0, greater than 2.15, greater than 2.5, greater than 2.7, greater than 3.0, greater than 3.3, greater than 4.0, greater than 5.0, or greater than 6.0.

Self-Cleaning/Virus-Inactivating Fabrics

In some cases, the disclosure relates to self-cleaning and/or microbial- or virus-inactivating fabrics that may comprise the fabrics and compositions disclosed herein. In some embodiments, the fabrics are configured into masks or other personal protective equipment (PPE). Face masks and other PPE can reduce risk of spreading or getting infected with respiratory viruses, such as SARS-CoV-2, the causative agent of Covid-19. However, in some instances (where the microbial/virus is not inactivated), the microbials/viruses can remain infectious in or on the outside of conventional PPE for extended periods of time.

This disclosure relates to self-cleaning and/or microbial- or virus-inactivating fabrics that have the synergistic combination of the ability to trap the microbial/virus and the ability to inactivate or neutralize the microbial/virus. As such, the disclosed fabrics are able to capture and inactivate microbials/viruses before they reach the protected user. In some cases, the composition of the fabric is relevant, as many conventional fabrics, e.g., polypropylene, are unable to effectively trap the microbial/virus (for enough time for inactivation).

It has been discovered that respiratory microbial/viruses can be advantageously inactivated via absorption of droplet containing the microbials/viruses and inactivation thereof on the surface and within the bulk of the fabric. In some embodiments, the fabrics may be constructed from polymers that maintain a moisture balance, e.g., polyamides, and contain embedded zinc ions within their matrix to inactivate any respiratory viruses.

In some specific cases, it has been found that cotton and PA66 readily absorb microbials/viruses, and that zinc ions embedded in the fabrics effectively inactivated the microbials/viruses, which resulted in at least a 2-log 10 reduction in virus titer after 30 seconds, which is more than sufficient to inactivate the number of infectious IAV virus particles (~24 plaque forming units [pfu]) present in a cough.

As shown in some of the Examples, with the disclosed fabrics, after addition of influenza A virus and SARS-CoV-2 thereto, inactivation rates were found to exceed the number of virus particles present in a typical cough. It has also been discovered that the influenza A virus surface protein haemagglutinin and the SARS-CoV-2 surface protein spike are destabilized on the disclosed fibers. These fibers may thus beneficially confer "self-cleaning" and broad-spectrum viral inactivation properties to PPE and complement existing PPE by reducing the risk of respiratory virus transmission even further.

Zinc/Copper Retention Rate

As noted herein, by utilizing a polymer composition having the aforementioned zinc compound, copper compound, and/or phosphorus compound in the disclosed concentrations, the resultant fiber and/or fabric is capable of retaining a higher percentage of zinc and/or copper, even after dyeing. The resulting yarns formed from the fibers have antiviral properties.

In some embodiments, the antiviral fibers formed from the polymer composition have a zinc and/or copper retention greater than 65% as measured by a dye bath test, e.g., greater than 75%, greater than 80%, greater than 90%, greater than 95%, greater than 97%, greater than 98%, greater than 99%, greater than 99.9%, greater than 99.99%, greater than 99.999%, greater than 99.99990%, greater than 99.99999% or greater than 99.999999%. In terms of upper limits, the antiviral fiber has a zinc and/or copper retention of less than 100%, e.g., less than 99.9%, less than 98%, or less than 95%. In terms of ranges, the antiviral fiber has a zinc and/or copper retention may be from 60% to 100%, e.g., from 60% to 99.999999%, from 60% to 99.99999%, from 60% to 99.9999%, from 60% to 99.999% from 60% to 99.999%, from 60% to 99.99%, from 60% to 99.9%, from 60% to 99%, from 60% to 98%, from 60% to 95%, from 65% to 99.9999990%, from 65% to 99.99999%, from 65% to 99.9999%, from 65% to 99.999% from 65% to 990.999%, from 65% to 100%, from 65% to 990.99%, from 65% to 99.9%, from 65% to 99%, from 65% to 98%, from 65% to 95%, from 70% to 100%, from 70% to 990.999999%, from 70% to 99.99999%, from 70% to 99.9999%, from 70% to 99.999% from 70% to 99.999%, from 70% to 99.99%, from 70% to 99.9%, from 70% to 99%, from 70% to 98%, from 70% to 95%, from 75% to 100%, from 75% to 990.99%, from 75% to 99.9%, from 75% to 990.999999%, from 75% to 99.99999%, from 75% to 99.9999%, from 75% to 99.999% from 75% to 99.999%, from 75% to 99%, from 75% to 98%, from 75% to 95%, %, from 80% to 99.999999%, from 80% to 99.99999%, from 80% to 99.9999%, from 80% to 99.999% from 80% to 99.999%, from 80% to 100%, from 80% to 99.99%, from 80% to 99.9%, from 80% to 99%, from 80% to 98%, or from 80% to 95%. In some cases, the ranges and limits relate to dye recipes having lower pH values, e.g., less than (and/or including) 5.0, less than 4.7, less than 4.6, or less than 4.5. In some cases, the ranges and limits relate to dye recipes having higher pH values, e.g., greater than (and/or including) 4.0, greater than 4.2, greater than 4.5, greater than 4.7, greater than 5.0, or greater than 5.0.

In some embodiments, the antiviral fibers (or other antiviral products) formed from the polymer composition have a zinc and/or copper retention greater than 40% after a dye bath, e.g., greater than 44%, greater than 45%, greater than 50%, greater than 55%, greater than 60%, greater than 65%, greater than 70%, greater than 75%, greater than 80%, greater than 90%, greater than 95%, or greater than 99%. In terms of upper limits, the antiviral fibers may have a zinc and/or copper retention of less than 100%, e.g., less than 99.9%, less than 98%, less than 95% or less than 90%. In terms of ranges, the antiviral fiber has a zinc and/or copper retention in a range from 40% to 100%, e.g., from 45% to 99.9%, from 50% to 99.9%, from 75% to 99.9%, from 80% to 99%, or from 90% to 98%. In some cases, the ranges and limits relate to dye recipes having higher pH values, e.g., greater than (and/or including) 4.0, greater than 4.2, greater than 4.5, greater than 4.7, greater than 5.0, or greater than 5.0.

In some embodiments, the antiviral fibers (or other antiviral products) formed from the polymer composition have a zinc and/or copper retention greater than 20%, e.g., greater than 24%, greater than 25%, greater than 30%, greater than 35%, greater than 40%, greater than 45%, greater than 50%, greater than 55%, or greater than 60%. In terms of upper limits, the antiviral fibers may have a zinc and/or copper retention of less than 80%, e.g., less than 77%, less than 75%, less than 70%, less than 68%, or less than 65%. In terms of ranges, the antiviral fibers may have a zinc and/or copper retention ranging from 20% to 80%, e.g., from 25% to 77%, from 30% to 75%, or from 35% to 70%. In some cases, the ranges and limits relate to dye recipes having lower pH values, e.g., less than (and/or including) 5.0, less than 4.7, less than 4.6, or less than 4.5.

Stated another way, in some embodiments, the antiviral fibers (or other antiviral products) formed from the polymer composition demonstrate an extraction rate of the zinc and/or copper compound less than 35% as measured by the dye bath test, e.g., less than 25%, less than 20%, less than 10%, or less than 5%. In terms of upper limits, the antiviral fiber demonstrates an extraction rate of the zinc and/or copper compound greater than 0%, e.g., greater than 0.1%, greater than 2% or greater than 5%. In terms of ranges, the antiviral fiber demonstrates an extraction rate of the zinc and/or copper compound from 0% to 35%, e.g., from 0% to 25%, from 0% to 20%, from 0% to 10%, from 0% to 5%, from 0.1% to 35%, from 0.1% to 25%, from 0.1% to 20%, from 0.2% to 10%, from 0.1% to 5%, from 2% to 35%, from 2% to 25%, from 2% to 20%, from 2% to 10%, from 2% to 5%, from 5% to 35%, from 5% to 25%, from 5% to 20%, or from 5% to 10%.

The zinc and/or copper retention of a fiber (or other product) formed from the polymer composition may be measured by a dye bath test according to the following standard procedure. A sample is cleaned (all oils are removed) by a scour process. The scour process may employ a heated bath, e.g., conducted at 71° C. for 15 minutes. A scouring solution comprising 0.25% on weight of fiber ("owf") of Sterox (723 Soap) nonionic surfactant and 0.25% owf of TSP (trisodium phosphate) may be used. The samples were then rinsed with water and then rinsed with cold water.

The cleaned samples may be tested according a chemical dye level procedure. This procedure may employ placing them in a dye bath comprising 1.0% owf of C.I. Acid Blue 45, 4.0% owf of MSP (monosodium phosphate), and a sufficient % owf of disodium phosphate or TSP to achieve a pH of 6.0, with a 28:1 liquor to fiber ratio. For example, if a pH of less than 6 is desired, a 10% solution of the desired acid may be added using an eye dropper until the desired pH was achieved. The dye bath may be preset to bring the bath to a boil at 100° C. The samples are placed in the bath for 1.5 hours. As one example, it may take approximately 30 minutes to reach boil and hold one hour after boil at this temperature. Then the samples are removed from the bath and rinsed. The samples are then transferred to a centrifuge for water extraction. After water extraction, the samples were laid out to air dry. The component amounts are then recorded.

In some embodiments, the zinc and/or copper retention of a fiber formed from the polymer composition may be calculated by measuring zinc and/or copper content before and after a dye bath operation. The amount of zinc and/or copper retained after the dye bath may be measured by known methods. For the dye bath, an Ahiba dyer (from Datacolor) may be employed. In a particular instance, twenty grams of un-dyed fabric and 200 ml of dye liquor may be placed in a stainless steel can, the pH may be adjusted to the desired level, the stainless steel can may be loaded into the dyer; the sample may be heated to 40° C. then heated to 100° C. (optionally at 1.5° C./minute). In some cases a temperature profile may be employed, for example, 1.5° C./minute to 60° C., 1° C./minute to 80° C., and 1.5° C./minute to 100° C. The sample may be held at 100° C. for 45 minutes, followed by cooling to 40° C. at 2° C./minute, then rinsed and dried to yield the dyed product.

In addition to the antimicrobial/antiviral properties, the disclosed compositions surprisingly demonstrated improved zinc retention after washing (washfastness) of the polymer. The zinc retention may be characterized in relation to washes. The fiber and/or fabric is capable of retaining a higher percentage of zinc and/or copper, even after washing, as such the resulting yarns formed from the fibers have AM/AV properties.

In some embodiments, the AM/AV fibers formed from the polymer composition have a zinc and/or copper retention greater than 85% as measured in after 5 washes, e.g., greater than 90%, greater than 92%, greater than 95%, greater than 96%, greater than 98%, greater than 99%, or greater than 99.9%.

In some embodiments, the AM/AV fibers formed from the polymer composition have a zinc and/or copper retention greater than 65% as measured in after 10 washes, e.g., greater than 70%, greater than 72%, greater than 80%, greater than 85%, greater than 90%, greater than 95%, greater than 99%.

As used herein, "greater than" and "less than" limits may also include the number associated therewith. Stated another way, "greater than" and "less than" may be interpreted as "greater than or equal to" and "less than or equal to."

Additional Components

In some embodiments, the polymer composition may comprise additional additives. The additives include pigments, hydrophilic or hydrophobic additives, anti-odor additives, additional antiviral agents, and antimicrobial/antifungal inorganic compounds, such as copper, zinc, tin, and silver.

In some embodiments, the polymer composition can be combined with color pigments for coloration for the use in fabrics or other components formed from the polymer composition. In some aspects, the polymer composition can be combined with UV additives to withstand fading and degradation in fabrics exposed to significant UV light. In some aspects, the polymer composition can be combined with additives to make the surface of the fiber hydrophilic or hydrophobic. In some aspects, the polymer composition can be combined with a hygroscopic material, e.g., to make the fiber, fabric, or other products formed therefrom more hygroscopic. In some aspects, the polymer composition can be combined with additives to make the fabric flame retardant or flame resistant. In some aspects, the polymer composition can be combined with additives to make the fabric stain resistant. In some aspects, the polymer composition can be combined with pigments with the antimicrobial compounds so that the need for conventional dyeing and disposal of dye materials is avoided.

In some embodiments, the polymer composition may further comprise additional additives. For example, the polymer composition may comprise a delusterant. A delusterant additive may improve the appearance and/or texture of the synthetic fibers and fabric produced from the polymer composition. In some embodiments, inorganic pigment-like materials can be utilized as delusterants. The delusterants may comprise one or more of titanium dioxide, barium sulfate, barium titanate, zinc titanate, magnesium titanate, calcium titanate, zinc oxide, zinc sulfide, lithopone, zirconium dioxide, calcium sulfate, barium sulfate, aluminum oxide, thorium oxide, magnesium oxide, silicon dioxide, talc, mica, and the like. In preferred embodiments, the delusterant comprises titanium dioxide. It has been found that the polymer compositions that include delusterants comprising titanium dioxide produce synthetic fibers and fabrics that greatly resemble natural fibers and fabrics, e.g., synthetic fibers and fabrics with improved appearance and/or texture. It is believed that titanium dioxide improves appearance and/or texture by interacting with the zinc compound, the phosphorus compound, and/or functional groups within the polymer.

In one embodiment, the polymer composition comprises the delusterant in an amount ranging from 0.0001 wt. % to 3 wt. %, e.g., 0.0001 wt. % to 2 wt. %, from 0.0001 to 1.75 wt. %, from 0.001 wt. % to 3 wt. %, from 0.001 wt. % to 2 wt. %, from 0.001 wt. % to 1.75 wt. %, from 0.002 wt. % to 3 wt. %, from 0.002 wt. % to 2 w %, from 0.002 wt. % to 1.75 wt. %, from 0.005 wt. % to 3 wt. %, from 0.005 wt. % to 2 wt. %, from 0.005 wt. % to 1.75 wt. %. In terms of upper limits, the polymer composition may comprise less than 3 wt. % delusterant, e.g., less than 2.5 wt. %, less than 2 wt. % or less than 1.75 wt. %. In terms of lower limits, the polymer composition may comprise greater than 0.0001 wt.

% delusterant, e.g., greater than 0.001 wt. %, greater than 0.002 wt. %, or greater than 0.005 wt. %.

In some embodiments, the polymer composition may further comprises colored materials, such as carbon black, copper phthalocyanine pigment, lead chromate, iron oxide, chromium oxide, and ultramarine blue.

In some embodiments, the polymer composition may include additional antiviral agents other than zinc. The additional antimicrobial agents may be any suitable antiviral. Conventional antiviral agents are known in the art and may be incorporated in the polymer composition as the additional antiviral agent or agents. For example, the additional antiviral agent may be an entry inhibitor, a reverse transcriptase inhibitor, a DNA polymerase inhibitor, an m-RNA synthesis inhibitor, a protease inhibitor, an integrase inhibitor, or an immunomodulator, or combinations thereof. In some aspects, the additional antimicrobial agent or agents are added to the polymer composition.

In some embodiments, the polymer composition may include additional antimicrobial agents other than zinc. The additional antimicrobial agents may be any suitable antimicrobial, such as silver, copper, and/or gold in metallic forms (e.g., particulates, alloys and oxides), salts (e.g., sulfates, nitrates, acetates, citrates, and chlorides) and/or in ionic forms. In some aspects, further additives, e.g., additional antimicrobial agents, are added to the polymer composition.

Exemplary Formulations

The polymer compositions described herein will be further understood by the following exemplary formulations and embodiments.

In one embodiment, the zinc compound comprises zinc oxide, zinc stearate, zinc pryithione, or zinc ammonium adipate, or combinations thereof, the phosphorus compound comprises benzene phosphinic acid, the molar ratio of the phosphorus to the zinc ranges from 0.01:1 to 3:1, the polymer composition has a relative viscosity of greater than 10, and fibers formed from the polymer composition demonstrate a retention rate of the zinc compound of greater than 85% when tested in a dye bath test.

In some embodiments, the antimicrobial agent, e.g., zinc, is added with the phosphorus compound to promote the incorporation of the antimicrobial agent into the polymer matrix of the polymer composition. This procedure advantageously allows for more uniform dispersion of the antimicrobial agent throughout the eventual fiber. Further, this combination "builds-in" the antimicrobial within the polymer composition to help prevent or limit the active antimicrobial ingredients from being washed from the fiber.

The following fibers/fabrics are exemplary.

Nanofibers made with PA6,6 and PA6,12 polymer prepared with a solution of zinc oxide, adipic acid, and ammonium hydroxide incorporated into the nylon prepolymerization solution.

Microfibers made with PA6,6, (low viscosity) 1500 wppm acetic acid; 205-315 wppm zinc from zinc strearate; low if any copper; and low phosphorus.

Spunbond fibers made with PA6,6, 1500 wppm acetic acid; 442-493 wppm zinc, ~20 wppm copper; spun with a coat weight of 10-34 gsm.

Knitted fabrics (in some cases greige) made with PA6,6, optional PA6, optional titanium dioxide, 186-500 zinc; low phosphorus, e.g., less than 75 wppm.

Interlocking fabric made from PA6,6 and PA6 and titanium dioxide, with 1500 wppm acetic acid, 488-510 wppm zinc; low phosphorus, e.g., less than 75 wppm.

Fabric made from a process using a multi-row die using PA6,6, 1500 wppm acetic acid; titanium dioxide, 453-503 wppm zinc, low phosphorus, e.g., less than 75 wppm; low if any copper; and ~900 potassium.

Fabric made from PA6,6, PA6, and PET with high zinc content, e.g., 8000-19000 wppm, and 125 wppm potassium.

Fabric made from yarn made from PA6,6 with 495-594 wppm zinc (from zinc pyrithione) and 8-486 wppm copper.

Fibers, Yarns, and Fabrics

In some cases, the polymer compositions may be used to prepare antiviral fibers and yarns formed from the polymer compositions disclosed herein. The polymer compositions impart permanent and/or near-permanent antiviral properties to the resulting fibers. The antiviral fibers can be formed from a polymer composition having a specific amount of zinc, e.g., from 5 wppm to 20,000 wppm (dispersed within the polymer composition), and a specific amount of phosphorus, e.g., less than less than 10,000 ppm (dispersed within the polymer composition).

The fibers formed from the antiviral polymer compositions may have any diameter suitable for it intended use. In some embodiments, the fibers may be intended for use in next-to-skin applications, and the fibers have an average fiber diameter less than the diameter of fibers formed for carpet-related applications, which are generally unsuitable for next-to-skin applications. For example the fibers may have an average fiber diameter less than 20 microns, e.g., less than 18 microns, less than 17 microns, less than 15 microns, less than 12 microns, less than 10 microns, less than 7 microns, less than 5 microns, less than 3 microns, less than 2 microns, less than 1 microns, or less than 0.5 microns.

In some embodiments, the fibers disclosed herein are micro, e.g., fibers having an average fiber diameter of greater than 1 micron. For example, the average fiber diameter of the microfibers may be greater than 1 micron, e.g., greater than 2 microns, greater than 5 microns, or greater than 10 microns. In terms of upper limits, the average fiber diameter of the microfibers may have an average fiber diameter of less than 20 microns, e.g., less than 15 microns, less than 10 microns, or less than 5 microns. In terms of ranges, the average fiber diameter of the microfibers may be from 1 to 20 microns, e.g., from 2 to 15 microns, or from 5 to 10 microns.

In some embodiments, the fibers disclosed herein are nanofibers, e.g., fibers having an average fiber diameter of less than 1 micron. For example, the average fiber diameter of the microfibers may be less than 1 micron, e.g., less than 0.9 microns, less than 0.8 microns, less than 0.7 microns, less than 0.6 microns, less than 0.5 microns, less than 0.4 microns, less than 0.3 microns, less than 0.2 microns, less than 0.1 microns, less than 0.05 microns, less than 0.04 microns, or less than 0.3 microns. In terms of upper limits, the average fiber diameter of the microfibers may have an average fiber diameter of less than 1 micron, e.g., less than 0.8 microns, less than 0.6 microns, or less than 0.5 microns. In terms of ranges, the average fiber diameter of the microfibers may be from 0.02 to 1 micron, e.g., from 0.02 to 0.9 microns, or from 0.02 to 0.80 microns.

To the extent not indicated otherwise, test methods for determining average fiber diameters, may be by use of conventional optical microscopes which are well known in the art.

In some aspects, the polymer composition can be processed to form antimicrobial fibers having lower denier levels. As noted above, some carpet-related references have disclosed an antimicrobial nylon prepared in water with a zinc compound, a copper compound, and/or a phosphorus compound. These references, however disclose higher denier levels (for example, greater than 12 dpf) and/or higher fiber diameter (for example, greater than 20 microns) fibers/filaments, e.g., carpet fibers and are not relevant to fibers/fabrics for next-to-skin end applications As used herein, "denier per filament" or "dpf" refers to the fiber thickness for an individual filament, e.g., a monofilament. In some aspects, the antimicrobial fiber has a denier less than 12 dpf, e.g., less than 10 dpf, less than 8 dpf, less than 6 dpf, less than 5 dpf, less than 4 dpf, less than 3 dpf, less than 2 dpf, or less than 1 dpf. In terms of ranges, the antimicrobial fiber has a denier in range from 0.1 dpf to 12 dpf, e.g., from 0.5 dpf to 10 dpf, from 0.1 dpf to 5 dpf, from 0.1 dpf to 3 dpf, from 0.1 dpf to 2 dpf, from 0.5 dpf t 3 dpf, from 1 dpf to 8 dpf, from 2 dpf to 6 dpf, from 3 dpf to 5 dpf. In terms of lower limits, the antimicrobial fiber has a denier greater than 0.1 dpf, e.g., greater than 0.5 dpf, greater than 0.8 dpf, greater than 1 dpf, greater than 2 dpf, greater than 4 dpf, or greater than 6 dpf.

A fabric can be made from the fibers. For example, fibers formed from the polymer composition may be spun to form a yarn. The yarn can then be used in knitting and/or weaving to provide fabrics exhibiting the antiviral properties of the polymer composition. Garments made from these fabrics can withstand normal wear, and is devoid of any coated, doped, or topical treatment, which tends to abrade off during knitting and weaving. The abrasion process results in dust on machines and fabric, and lowers the effective use time of garments in normal wear and laundering.

In some cases, the fibers may be multiple component fibers, e.g., bicomponent fibers, wherein one or more of the components employ the polymer compositions. One example is a nylon/zinc sheath around a pure nylon core.

Methods of Making Fibers

In some aspects, the fibers, e.g., polyamide fibers, are made by extruding a polymer formed in a melt polymerization process. During the melt polymerization process of the polymer composition, an aqueous monomer solution, e.g., salt solution, is heated under controlled conditions of temperature, time and pressure to evaporate water and effect polymerization of the monomers, resulting in a polymer melt. During the melt polymerization process, sufficient amounts of a zinc compound, a copper compound, and/or a phosphorus compound are employed in the aqueous monomer solution to form the polymer composition before polymerization. Additional components, such as delusterants, pigments, and additional antiviral agents, may also be employed in the aqueous monomer solution. After the zinc compound, the copper compound, and/or the phosphorus compound are present in the aqueous monomer solution, the polymer composition may be polymerized. The polymerized polymer can subsequently be extruded into fibers. In some cases, the polymerized polymer can be extruded into other shapes, e.g., for use in preparing a high-contact product, as discussed below.

In some embodiments, the process for preparing an antiviral fiber (or other antiviral product) having near-permanent antiviral properties from the polymer composition includes preparing an aqueous monomer solution, adding from 10 wppm to 20,000 wppm of zinc in a zinc compound dispersed within the aqueous monomer solution, and adding from 0.01 wt. % to 1 wt. % of phosphorus in a phosphorus compound, polymerizing the aqueous monomer solution to form a polymer melt, and extruding the polymer melt to form an antiviral fiber (or other antiviral product, e.g., a high-contact product and/or a surface layer of a high-contact product). In this embodiment, the polymer composition comprises the resultant aqueous monomer solution after zinc and phosphorus are added. In some aspects, the polymer melt can be extruded to form an antiviral fiber having a denier per filament as mentioned above.

In some embodiments, the process includes preparing an aqueous monomer solution. The aqueous monomer solution may comprise amide monomers. In some embodiments, the concentration of monomers in the aqueous monomer solution is less than 60 wt. %, e.g., less than 58 wt. %, less than 56.5 wt. %, less than 55 wt. %, less than 50 wt. %, less than 45 wt. %, less than 40 wt. %, less than 35 wt. %, or less than 30 wt. %. In some embodiments, the concentration of monomers in the aqueous monomer solution is greater than 20 wt. %, e.g., greater than 25 wt. %, greater than 30 wt. %, greater than 35 wt. %, greater than 40 wt. %, greater than 45 wt. %, greater than 50 wt. %, greater than 55 wt. %, or greater than 58 wt. %. In some embodiments, the concentration of monomers in the aqueous monomer solution is in a range from 20 wt. % to 60 wt. %, e.g., from 25 wt. % to 58 wt. %, from 30 wt. % to 56.5 wt. %, from 35 wt. % to 55 wt. %, from 40 wt. % to 50 wt. %, or from 45 wt. % to 55 wt. %. The balance of the aqueous monomer solution may comprise water and/or additional additives. In some embodiments, the monomers comprise amide monomers including a diacid and a diamine, i.e., nylon salt.

In some embodiments, the aqueous monomer solution is a nylon salt solution. The nylon salt solution may be formed by mixing a diamine and a diacid with water. For example, water, diamine, and dicarboxylic acid monomer are mixed to form a salt solution, e.g., mixing adipic acid and hexamethylene diamine with water. In some embodiments, the diacid may be a dicarboxylic acid and may be selected from the group consisting of oxalic acid, malonic acid, succinic acid, glutaric acid, pimelic acid, adipic acid, suberic acid, azelaic acid, sebacic acid, undecanedioic acid, dodecandioic acid, maleic acid, glutaconic acid, traumatic acid, and muconic acid, 1,2- or 1,3-cyclohexane dicarboxylic acids, 1,2- or 1,3-phenyl enediacetic acids, 1,2- or 1,3-cyclohexane diacetic acids, isophthalic acid, terephthalic acid, 4,4'-oxybisbenzoic acid, 4,4-benzophenone dicarboxylic acid, 2,6-napthalene dicarboxylic acid, p-t-butyl isophthalic acid and 2,5-furandicarboxylic acid, and mixtures thereof. In some embodiments, the diamine may be selected from the group consisting of ethanol diamine, trimethylene diamine, putrescine, cadaverine, hexamethyelene diamine, 2-methyl pentamethylene diamine, heptamethylene diamine, 2-methyl hexamethylene diamine, 3-methyl hexamethylene diamine, 2,2-dimethyl pentamethylene diamine, octamethylene diamine, 2,5-dimethyl hexamethylene diamine, nonamethylene diamine, 2,2,4- and 2,4,4-trimethyl hexamethylene diamines, decamethylene diamine, 5-methylnonane diamine, isophorone diamine, undecamethylene diamine, dodecamethylene diamine, 2,2,7,7-tetramethyl octamethylene diamine, bis(p-aminocyclohexyl)methane, bis(aminomethyl)norbornane, $C_2$-$C_{16}$ aliphatic diamine optionally substituted with one or more $C_1$ to $C_4$ alkyl groups, aliphatic polyether diamines and furanic diamines, such as 2,5-bis (aminomethyl)furan, and mixtures thereof. In preferred embodiments, the diacid is adipic acid and the diamine is hexamethylene diamine which are polymerized to form nylon 6,6.

It should be understood that the concept of producing a polyamide from diamines and diacids also encompasses the concept of other suitable monomers, such as, aminoacids or lactams. Without limiting the scope, examples of aminoacids can include 6-aminohaxanoic acid, 7-aminoheptanoic acid, 11-aminoundecanoic acid, 12-aminododecanoic acid, or combinations thereof. Without limiting the scope of the disclosure, examples of lactams can include caprolactam, enantholactam, lauryllactam, or combinations thereof. Suitable feeds for the disclosed process can include mixtures of diamines, diacids, aminoacids and lactams.

Of course, as noted above, polyamides are only one type of polymer that may be utilized in the disclosed process. In addition, other polymerization reactants/reactions are contemplated.

After the aqueous monomer solution is prepared, a zinc compound, a copper compound, and/or a phosphorus compound are added to the aqueous monomer solution to form the polymer composition. In some embodiments, less than 20,000 ppm of zinc and/or less than 20,000 ppm of copper is dispersed within the aqueous monomer solution. In some aspects, further additives, e.g., additional antiviral agents, are added to the aqueous monomer solution.

In some cases, the polymer composition is polymerized using a conventional melt polymerization process. In one aspect, the aqueous monomer solution is heated under controlled conditions of time, temperature, and pressure to evaporate water, effect polymerization of the monomers and provide a polymer melt. In some aspects, the use of the zinc compound, the copper compound, and/or the phosphorus compound may advantageously improve the relative viscosity of the polymer composition, diminish the extraction rate of the zinc and/or copper compound during dyeing, and, and enhance its dyeability of the resultant antiviral fiber.

In some aspects, an antiviral nylon is prepared by a conventional melt polymerization of a nylon salt. Typically, the nylon salt solution is heated under pressure (e.g. 250 psig/$1825 \times 10^3$ n/m$^2$) to a temperature of, for example, about 245° C. Then the water vapor is exhausted off by reducing the pressure to atmospheric pressure while increasing the temperature to, for example, about 270° C. Before polymerization, zinc and/or copper and, optionally, phosphorus be added to the nylon salt solution. The resulting molten nylon is held at this temperature for a period of time to bring it to equilibrium prior to being extruded and/or molded into a fiber or other product. In some aspects, the process may be carried out in a batch or continuous process.

In some embodiments, during melt polymerization, the zinc compound, e.g., zinc oxide, the copper compound, and/or the phosphorus compound, e.g., benezene phosphinic acid, are added to the aqueous monomer solution. The antiviral fiber (or other antiviral product) may comprise a polyamide that is made in a melt polymerization process and not in a master batch process. In some aspects, the resulting fiber has near-permanent antiviral properties.

Masterbatches may employ higher amounts of AM/AV compound, see higher ranges disclosed herein. Beneficially, the masterbatches may be employed as one method to achieve the desired zinc loading levels.

The antiviral agent may be added to the polyamide during melt polymerization, and thereafter, the fiber (or other product) may be formed from extrusion and/or molding. Of course, other fiber forming methods are also contemplated. The formed fibers may be spun to form a resultant yarn to be used in knitting and/or weaving to provide the antiviral properties in the fabrics. While polyamide may be used to explain one aspect of the disclosure, it is understood that numerous polymers may be used herein without deviating from the present scope of the disclosure.

In some embodiments, the polymer composition is extruded in order to create a fiber. The extrusion process itself depends on the temperature of the mixture being sufficiently high to melt the mixture. A melting step may be a separate step or it may be part of either the mixing process or the extruding process. When the mixture is at a sufficiently high temperature, the mixture may be extruded using conventional mechanisms. The fiber may then be drawn, crimped, cut and spun into a yarn or other fabric depending on the intended end use. In some embodiments, the yarn is then dyed.

Nonwoven Polymer Structures

The present disclosure also relates to nonwoven polymer structures, or nonwoven products, formed from the polymer compositions disclosed herein. The polymer compositions impart permanent and/or near-permanent antiviral properties to the resulting nonwoven products. The antiviral nonwoven products can be formed from a polymer composition having a specific amount of zinc and/or copper, e.g., from 5 wppm to 20,000 wppm (dispersed within the polymer composition), and a specific amount of phosphorus, e.g., less than less than 10,000 ppm (dispersed within the polymer composition).

In some embodiments, the nonwoven polymer structure is formed via melt spinning or melt blowing. In some embodiments, the nonwoven polymer structure is formed via solution spinning. In some embodiments, the nonwoven polymer structure is formed via spunbonding. Conventional methods of preparing a nonwoven polymer structure may be employed to form nonwoven products from the polymer compositions described herein. Exemplary methods are disclosed in US Pub. No. 2018/0371656, which is incorporated herein by reference.

In some embodiments, the nonwoven polymer structure includes fibers having and average fiber diameter less than 25 microns, e.g., less than 20 microns, less than 15 fibers, less than 10 microns, or less than 10 microns. In some embodiments, the nonwoven polymer structures disclosed herein are micro, e.g., fibers having an average fiber diameter of greater than 1 micron. For example, the average fiber diameter of the microfibers may be greater than 1 micron, e.g., greater than 2 microns, greater than 5 microns, or greater than 10 microns. In terms of ranges, the average fiber diameter of the microfibers may be from 1 to 20 microns, e.g., from 2 to 15 microns, or from 5 to 10 microns.

In some embodiments, the nonwoven polymer structures disclosed herein are nano, e.g., fibers have an average fiber diameter measured in nanometers. For example, fibers of the nonwoven polymer structure have an average fiber diameter less than 1 micron, e.g., less than 950 nanometers, less than 900 nanometers, less than 850 nanometers, or less than 800 nanometers. In terms of lower limits, the fibers of the nonwoven polymer structure have an average fiber diameter greater than 10 nanometers, greater than 50 nanometers, greater than 100 nanometers, or greater than 150 nanometers. In some embodiments, less than 20% of the fibers have a diameter of greater than 700 nanometers, e.g., less than 15%, less than 12%, less than 10% or less than 8%.

Methods of Making Nonwoven Polymer Structures

The present disclosure also provides methods for making a nonwoven polymer structure having antiviral properties. In particular, the present disclosure describes making a nonwoven polymer by providing any of the polymer compositions provided herein and forming a nonwoven polymer structure therefrom. By these methods, a nonwoven polymer structure can be prepared from any of the polymer compositions described herein.

As with the methods of making fibers, discussed above, the methods of making nonwoven polymer structures may include preparing an aqueous monomer solution. In some embodiments, the aqueous monomer solution is a nylon salt solution. As above, the nylon salt solution may be formed by mixing a diamine and a diacid with water. For example, water, diamine, and dicarboxylic acid monomer are mixed to form a salt solution, e.g., mixing adipic acid and hexamethylene diamine with water. In some embodiments, the diacid may be a dicarboxylic acid and may be selected from the group consisting of oxalic acid, malonic acid, succinic acid, glutaric acid, pimelic acid, adipic acid, suberic acid, azelaic acid, sebacic acid, undecanedioic acid, dodecandioic acid, maleic acid, glutaconic acid, traumatic acid, and muconic acid, 1,2- or 1,3-cyclohexane dicarboxylic acids, 1,2- or 1,3-phenyl enediacetic acids, 1,2- or 1,3-cyclohexane diacetic acids, isophthalic acid, terephthalic acid, 4,4'-oxybisbenzoic acid, 4,4-benzophenone dicarboxylic acid, 2,6-napthalene dicarboxylic acid, p-t-butyl isophthalic acid and 2,5-furandicarboxylic acid, and mixtures thereof. In some embodiments, the diamine may be selected from the group consisting of ethanol diamine, trimethylene diamine, putrescine, cadaverine, hexamethyelene diamine, 2-methyl pentamethylene diamine, heptamethylene diamine, 2-methyl hexamethylene diamine, 3-methyl hexamethylene diamine, 2,2-dimethyl pentamethylene diamine, octamethylene diamine, 2,5-dimethyl hexamethylene diamine, nonamethylene diamine, 2,2,4- and 2,4,4-trimethyl hexamethylene diamines, decamethylene diamine, 5-methylnonane diamine, isophorone diamine, undecamethylene diamine, dodecamethylene diamine, 2,2,7,7-tetramethyl octamethylene diamine, bis(p-aminocyclohexyl)methane, bis(aminomethyl)norbornane, $C_2$-$C_{16}$ aliphatic diamine optionally substituted with one or more $C_1$ to $C_4$ alkyl groups, aliphatic polyether diamines and furanic diamines, such as 2,5-bis (aminomethyl)furan, and mixtures thereof. In preferred embodiments, the diacid is adipic acid and the diamine is hexamethylene diamine which are polymerized to form nylon 6,6.

After the aqueous monomer solution is prepared, a zinc compound, a copper compound, and/or a phosphorus compound are added to the aqueous monomer solution to form the polymer composition. In some embodiments, less than 20,000 ppm of zinc and/or less than 20,000 ppm of copper is dispersed within the aqueous monomer solution. In some embodiments, for example, from 5 wppm to 20,000 ppm of a zinc compound, from 5 wppm to 20,000 wppm of a copper compound, and from 0.005 to 1 wt. % of a phosphorus compound are dispersed within the aqueous monomer solution. In some aspects, further additives, e.g., additional antiviral agents, are added to the aqueous monomer solution.

From the aqueous monomer solution, the nonwoven polymer structure can be formed. A number of methods of forming a nonwoven polymer structure from a polymer solution are known to those of skill in the art. These may be utilized to form the nonwoven polymer solution from the polymer solution. In some embodiments, the nonwoven polymer structure is formed via melt spinning. In some embodiments, the nonwoven polymer structure is formed via melt blowing. In some embodiments, the nonwoven polymer structure is formed via solution spinning. In some embodiments, the nonwoven polymer structure is formed via spunbonding. In some embodiments, a combination of melt blowing, melt spinning, solution spinning, and/or spunbonding is utilized.

In some embodiments, the use of a multi-row die, as compared to a single row die, may be employed to produce the fibers/fabrics. The composition and characteristics of the polymer compositions, e.g., RV, allow the use of multi-row dies. As such, the processes for making the fibers/fabrics have additional process benefits as a result, e.g., an increased production rate, at least in part due to the properties of the polymer composition.

Applications

The present disclosure related to various applications of the antiviral polymer compositions and the fibers, fabrics, and nonwoven polymer structures formed therefrom. As described above, these products demonstrate permanent, e.g., near-permanent, antiviral properties. Thus, the polymer composition can be incorporated into any of a variety of products for which prolonged protection from viral infection and/or pathogenesis may be desirable.

In some aspects, a medical product or device may be prepared using the polymer compositions described herein. In some embodiments, for example, a medical product or device may be prepared from fibers, yarns, or fabrics formed from the polymer composition. In some embodiments, a medical product or device may be prepared from a nonwoven polymer structure formed from the polymer composition.

Because the fibers and/or nonwoven polymer structures exhibit permanent AM/AV properties, the medical product or device may also exhibit AM/AV antiviral properties. Thus, in some cases, the medical product or device may be reusable. Particular examples include wound care products, e.g., bandages, sheets, and gauzes.

Examples of medical products or devices that can be prepared using the polymer compositions include masks, wipes, towels, gowns, protective clothing, or protect nets.

For example, the polymer composition may be used in the preparation of a mask, e.g., a surgical mask, a procedure mask, a medical mask, and/or a dust mask, having antiviral properties. The antiviral properties of the mask may be particular useful in protecting against the transmission and/or infection of a virus, e.g., between and/or among healthcare workers or members of a larger population. The structure of the mask is not particularly limited, and any known structure may be used. Preferably, the mask is designed so as to ensure adequate protection (e.g., against transmission) while providing for wearer comfort and breathability. In some cases, the mask comprises a number of layers, e.g., one or more layers, two or more layers, or three or more layers. In some embodiments, one or more layers of the mask may be formed by a fabric according the present disclosure. In some embodiments, one or more layers of the mask may be formed by a nonwoven polymer structure according the present disclosure. In some aspects, the mask may be formed with two or more layers of the nonwoven polymer structure. In some aspects, the mask further comprises one or more layers of an antiviral fabric (as disclosed herein) in combination with one or more layers of an antiviral nonwoven polymer structure (as disclosed herein).

By way of another example, the polymer composition may be used in the preparation of a filter, e.g., an air filter, a HEPA filter, an automotive cabin air filter, or an aircraft air filter. The antiviral properties of the filter may be particular useful in protecting against the transmission and/or infection of a virus, e.g., by air flow units (such as HVAC). The structure of the filter is not particularly limited, and any known structure may be used. Preferably, the filter is designed so as to ensure adequate protection (e.g., against transmission) while providing for appropriate permeability. In some cases, the filter comprises a number of layers, e.g., one or more layers, two or more layers, or three or more layers. In some embodiments, one or more layers of the filter may be formed by a fabric according the present disclosure. In some embodiments, one or more layers of the filter may be formed by a nonwoven polymer structure according the present disclosure. In some aspects, the filter may be formed with two or more layers of the nonwoven polymer structure. In some aspects, the filter further comprises one or more layers of an antiviral fabric (as disclosed herein) in combination with one or more layers of an antiviral nonwoven polymer structure (as disclosed herein).

By way a more general example, the polymer composition may be used in the preparation of a layered structure, which may have any of a variety of uses. The layered structure may comprise, for example, an antiviral nonwoven layer comprising a described polymer composition as well as an additional layer. The incorporation of the polymer composition into the layered structure provides the layered structure with antiviral properties, such as limiting, reducing, or inhibiting infection and/or pathogenesis of a virus. In some cases, the layered structure may include an additional antiviral agent, optionally comprising an entry inhibitor, a reverse transcriptase inhibitor, a DNA polymerase inhibitor, an m-RNA synthesis inhibitor, a protease inhibitor, an integrase inhibitor, or an immunomodulator, or combinations thereof. In some cases, the layer structure includes a fabric of nanofibers produced from the polymer composition. In some cases, the layer structure includes a nonwoven polymer structure produced from the polymer composition.

Those skilled in the art will appreciate that fibers, yarns, fabrics, and nonwoven polymer structures exhibiting antiviral properties may be desirably incorporated into other products, such as textiles, for any of a variety of uses.

High-Contact Products

The polymer composition may be used in the preparation of a high-contact product. A high-contact product may be any product that is handled (e.g., touched) by a user or otherwise comes into contact with the user during conventional use. The polymer compositions may be utilized for high-contact products used in any setting.

In some embodiments, a disclosed polymer composition alone is used to prepare a high-contact product. Said another way, a high-contact product may be entirely composed of a polymer composition. In some embodiments, a disclosed polymer composition is a component of the high contact product. For example, the polymer composition may form a layer (e.g., a surface coating) on the high-contact product.

As discussed above, the polymer compositions described herein demonstrate antiviral properties, and these properties may be surprisingly enhanced by certain characteristics of the polymer composition. For example, the use of a hydrophilic and/or hygroscopic polymer improves (e.g., increases) the antiviral activity of the polymer composition. Thus, the polymer compositions may be especially useful for high-contact products that come into contact with moisture during typical use. For example, the polymer compositions may be especially useful for masks (e.g., medical masks) and air filters (e.g., HVAC filters, automobile filters, aviation filters)

Methods of making the high-contact product are not particularly limited, and conventional methods may be used. In some embodiments, for example, a hot melt polymerization (e.g., as discussed above with respect to fibers and nonwoven polymer structures) may be used to prepare the polymer composition, which may then be extruded and/or formed into the high-contact product.

The following examples are illustrative and should not be read as limiting the definition of a high-contact product.

In some cases, the high-contact product may be a piece or portion of furniture, e.g., for use in an academic, business, or medical setting. For example, the polymer composition may be used in the preparation of a chair (e.g., as a part or all of a chair base, a chair handle, a chair seatback, or a chair leg), a table (e.g., as a part or all of a tabletop or a table leg), a desk (e.g., as a part or all of a desktop or a desk leg), shelving, or a bed (e.g., as a part or all of a bedframe, a bed railing, a bed leg, a headboard, or a footboard).

In some cases, the high-contact product may be a piece or portion of a consumer product, e.g., consumer electronics. For example, the polymer composition may be used in the preparation of a housing or case for a cellular phone, a component of computer (e.g., a housing, a display, a keyboard, or a mouse of a desktop computer or a laptop computer), a component of a kitchen or culinary item (e.g., a refrigerator, oven, stove, range, microwave oven, cookware, or cooking utensil), or a component of a personal hygiene product (e.g., a toothbrush, hair brush, comb, toilet seat, toilet seat cover, razor, or an air filter).

In some cases, the high-contact product may be a piece or portion of medical equipment. For example, the polymer composition may be used in the preparation of monitor equipment (e.g., a blood pressure monitor or an ultrasound probe), radiology equipment (e.g., a portion of an MRI machine or a CT machine), a ventilator, or a patient transfer sheet.

In some cases, the high-contact product may be a piece or portion of a textile product. For example, the polymer composition may be used in the preparation of clothing, a medical gown, a medical mask, a medical drape, a patient transfer slip sheet, curtains, bedding (e.g., bedsheets, a duvet, a duvet cover, a pillow, or a pillow cover), or luggage (e.g., a suitcase or a garment bag), shoes (e.g., a shoe upper, a shoe lining, or sewing thread for a shoe).

In some cases, the high-contact product may be a molded article. For example, the polymer composition may be used in the preparation of packaging (e.g., disposable or reusable food and/or liquid packaging), automotive parts or components, mechanical parts, toys, musical instruments, furniture, or storage containers.

As another specific example, the polymer compositions may be employed in making AM/AV cable ties. Here, the combination of AM/AV properties and mechanical strength is synergistic.

As noted above, the polymer of the polymer composition may be hydrophilic and/or hygroscopic. This may be particularly beneficial for certain high-contact products (and other applications mentioned herein), which may be exposed to moisture during operation. Moisture (e.g., moisture present on the skin, in sweat, or in saliva) typically facilitates viral transmission, and a hydrophilic and/or hygroscopic polymer composition may draw in virus-containing moisture. In particular, the moisture may be attracted to the composition (e.g., on a surface of the high-contact product), and the composition may then kill a virus contained therein. Thus, the disclosed polymer compositions may be used in forming (in whole or in part) high-contact products that greatly reduce transmission of a virus.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims or the equivalents thereof.

EXAMPLES

Samples of exemplary polymer compositions were prepared using a polymer and a zinc compound, e.g., zinc oxide, zinc ammonium adipate, and/or zinc stearate, as shown in Table 1A. The base polymer included nylon-6,6; nylon-6; olefin polymer, spandex, and/or long chain polymers, e.g., nylon 6,12. In some samples, the polymer composition comprised an additional component, e.g., a copper compound. The (nylon) polymer of each sample was made by a batch process, in which nylon-6,6 salt was processed in an evaporator to achieve the desired concentration, and then polymerized in an autoclave. Unless indicated otherwise, the zinc compound (and any additional component) was added to the salt solution in an evaporation step before polymerization.

The polymer compositions were then used to form fibers/fabrics by melt blowing (for nonwovens), spunbonding, or by spinning the polymer composition, drawing, and texturing (for knit fabrics). The zinc contents of the compositions and/or fibers/fabrics were measured and noted.

The polymer compositions were tested for *Klebsiella pneumonia* efficacy in accordance with ISO20743:2013. The compositions and forms of the samples and the *Klebsiella pneumonia* efficacy results are shown as a log reduction in Table 1.

The polymer compositions were also tested for *Staphylococcus aureus* efficacy in accordance with ISO20743: 2013, ASTM E3160 (2018), and AATCC 100, and the polymer compositions were tested for *Escherichia coli* efficacy in accordance with ASTM E3160 (2018). In some cases, samples prepared as described in Table 1 were further tested for *Staphylococcus aureus* efficacy. In other cases, additional new samples were prepared and tested.

The compositions and forms of the samples and the *Staphylococcus aureus* and *Escherichia coli* efficacy results are shown as a log reduction in Tables 2 and 3, respectively.

It is noted that the use of the aforementioned zinc compounds, and optionally copper and/or phosphorus compounds, provides for suitable, if not improved processability. For example, the use of these formulations provides for relative viscosities that are suitable for melt blowing. Conventional compositions do not employ the specific amounts of components, and as such, are unable to achieve the desired relative viscosity, which in turn contributes to processing difficulties, e.g., inability to produce some specific sizes of fibers. As one example, polymer formulations (with higher RV) that are suitable for carpet fiber formation (much higher fiber diameter/denier) have been found to be unusable in meltblowing or spunbonding equipment.

TABLE 1

Polymer Compositions and *Klebsiella pneumonia* Efficacy

| # | Comment | Polymer | Zn | Cu | *Klebsiella pneumonia* log red |
|---|---|---|---|---|---|
| A13 | Nano washed 10X | PA6,6, HOAc, zinc | 268 | | 1.62 |
| A3 | Bright polymer + Zinc Stearate | PA6,6, + PA6 + zinc; Zn-St | 696 | | 2.70 |
| A4 | Bright polymer + Zinc Stearate | PA6,6, + PA6 + zinc; Zn-St | 661 | | 2.70 |
| A7 | Nanofiber | AP6,6 + HOAc + zinc; Zn-St | 500 | | 4.89 |
| A8 | Nanofiber (with scrim) | PA6,6, HOAc, zinc; ZAA | 438 | | 3.35 |
| B1 | PA612 Nano NW4 | PA612 + ZnO + adip + NH3OH (pre pol) | 620-690 | | 3.64 |
| C11 | Microfiber (no scrim) | PA6,6, HOAc, zinc; ZnSt | 683 | | 4.45 |
| C14 | Micro washed 10X | PA6,6, HOAc, zinc | 243 | | 2.76 |
| C15 | Micro washed 20X | PA6,6, HOAc, zinc | 205 | | 1.79 |
| C5 | Low viscosity | PA6,6 + Zn-St | 309 | | 4.01 |
| C8 | Low viscosity | PA6,6 + Zn-St | 315 | | 6.72 |
| D6 | Spunbond 10 gsm | PA6,6 + HOAc + Zn + Cu | 493 | 19.8 | 4.57 |
| D7 | Spunbond 20 gsm | PA6,6 + HOAc + Zn + Cu | 471 | 20.1 | 3.98 |
| D8 | Spunbond 34 gsm | PA6,6 + HOAc + Zn + Cu | 442 | 18.8 | 3.51 |
| E1 | SB | PA6,6 + HOAc + Zn + Cu | 508 | 26 | 5.4 |
| E2 | SB | PA6,6 + HOAc + Zn + Cu | 461 | 20 | 5 |
| E3 | SB | PA6,6 + HOAc + Zn + Cu | 438 | 19 | 2.7 |
| E4 | SB | PA6,6 + HOAc + Zn + Cu | 823 | 18 | 4.6 |
| E5 | SB | PA6,6 + HOAc + Zn + Cu | 724 | 25 | 3.4 |
| F1 | | PA6,6 + TiO2 + zinc | 452 | | 3.00 |
| F13 | Low P | PA6,6 + TiO2 + zinc; ZAA | 186 | | 1.82 |
| F2 | Socks; scoured | PA6,6 + zinc; ZAA | 464 | | 4.00 |
| F3 | Socks; scoured | PA6,6, + PA6 + zinc; ZAA | 461 | | 3.70 |
| F4 | Socks; scoured; low P | PA6,6 + PA6 + TiO2 + zinc; ZAA | 428 | | 3.10 |
| F5 | Knitted; P | PA6,6 + PA6 + TiO2 + zinc; ZAA | 447 | | 3.30 |
| F6 | Knitted; P | PA6,6 + PA6 + TiO2 + zinc | 447 | | 3.30 |
| F8 | Greige; | PA6,6 + TiO2 + zinc | 375 | | 5.00 |
| F9 | Greige; P | PA6,6 + PA6 + TiO2 + zinc | 500 | | 5.20 |
| G10 | Yarn/fabric Dyed; P | PA6,6 + PA6 + TiO2 + zinc | 350 | | 2.58 |
| G11 | Yarn/fabric Dyed; P | PA6,6 + PA6 + TiO2 + zinc | 487 | | 8.32 |

TABLE 1-continued

Polymer Compositions and *Klebsiella pneumonia* Efficacy

| # | Comment | Polymer | Zn | Cu | *Klebsiella pneumonia* log red |
|---|---|---|---|---|---|
| G12 | Yarn/fabric Dyed; P | PA6,6 + PA6 + TiO2 + zinc | 487 | | 4.45 |
| G2 | Yarn/fabric Dyed; P | PA6,6 + PA6 + TiO2 + zinc | 488 | | 2.14 |
| G4 | Yarn/fabric Dyed; P | PA6,6 + PA6 + TiO2 + zinc | 510 | | 2.87 |
| G6 | Yarn/fabric Dyed; P washed 25X | PA6,6 + PA6 + TiO2 + zinc | 499 | | 3.34 |
| G7 | Yarn/fabric Dyed; P washed 50X | PA6,6 + PA6 + TiO2 + zinc | 505 | | 6.07 |
| H1 | Spandex 1X Washed | PA6,6 + PA6 + TiO2 + zinc | 454 | | 2.20 |
| H2 | Spandex; P | PA6,6 + PA6 + TiO2 + zinc | 431 | | 2.37 |
| I1 | Jersey 1X wash; P | PA6,6 + PA6 + TiO2 + zinc | 514 | | 4.33 |
| I2 | Jersey 1X wash; P | PA6,6 + PA6 + TiO2 + zinc | 512 | | 4.48 |
| K1 | Solution dye | PA6,6 + zinc; ZnSt | 481 | | 1.38 |
| K2 | | PA 6,6 + ZnO + adipic (prepol) | 619 | | 3.58 |
| L1 | Multi-row Trial #3 30 gsm | PA6,6, HOAc, zinc | 453 | | 3.28 |
| L2 | Multi-row #3 18 gsm | PA6,6, HOAc, zinc | 455 | | 3.76 |
| L3 | Multi-row #3 30 gsm (1X) | PA6,6, HOAc, zinc | submit | | 2.39 |
| L4 | Multi-row #4 10 gsm | PA6,6, HOAc, zinc | 477 | | 2.86 |
| L5 | Multi-row #4 10 gsm 1X wash | PA6,6, HOAc, zinc | 503 | | 4.47 |
| L6 | Multi-row #4 18 gsm | PA6,6, HOAc, zinc | 464 | | 2.89 |
| L7 | Multi-row #4 18 gsm 1X wash | PA6,6, HOAc, zinc | 468 | | 3.27 |
| N1 | | PA6,6 + PA6 + TiO2 + zinc | 414 | | 1.32 |
| O1 | Dyed (Light Brown) control | PA6,6 + PA6 + TiO2 | 1 | | -0.40 |
| O2 | Dyed (Reddish Grey) control | PA6,6 + PA6 + TiO2 | 1 | | -0.40 |
| O3 | Dyed (Blue) control | PA6,6 + PA6 + TiO2 | 2 | | -0.30 |
| O7 | Nylon Control Sock | PA6,6 | 0 | | 0.30 |
| P1 | PET | PET | 1 | | -0.30 |
| Q1 | PET; P | PA6,6 + PA6 + TiO2 + PET | 200 | | 1.77 |
| Q2 | PET; P | PA6,6 + PA6 + PET | 8000 | | 2.43 |
| Q3 | PET; P | PA6,6 + PA6 + PET | 19000 | | 1.41 |
| R2 | Loose yarn | PA6,6, + PA6 + zinc | 495 | 8 | 2.1 |
| R4 | Cu/Zn yarn | PA6,6 + zinc + copper | 534 | 486 | 5.7 |
| S1 | Zinc Pyrithione | PA6,6 + zinc; Zn pyrit | 739 | | 2.38 |

As shown in Table 1, fibers/fabric formed from the polymer compositions described herein demonstrated excellent *Klebsiella pneumonia* a reduction efficacy. Generally speaking, the combinations of zinc (and optionally copper) in the disclosed amounts (optionally along with other features) provided for surprisingly high *Klebsiella pneumonia* log reductions, e.g., over 0.9, over 2.0, or over 3.0.

*Staphylococcus aureus* results are shown in Table 2.

TABLE 2

Polymer Compositions and *Staphylococcus aureus* Efficacy

| # | Sample | Polymer | Zn | Cu | 20743 | E3160 | AATC 100 |
|---|---|---|---|---|---|---|---|
| A12 | 500BSC Nanofiber washed 1X | PA6,6, HOAc, zinc | 445 | | | 0.60 | |
| A13 | Nano washed 10X | PA6,6, HOAc, zinc | 268 | | 4.71 | 0.83 | |
| A3 | Bright polymer + Zinc Stearate | PA6,6, + PA6 + zinc; Zn-St | 696 | | 2.80 | | |
| A4 | Bright polymer + Zinc Stearate | PA6,6, + PA6 + zinc; Zn-St | 661 | | 2.60 | | |
| A7 | Nanofiber | AP6,6 + HOAc + zinc; Zn-St | 500 | | 6.30 | | |
| A8 | Nanofiber (with scrim) | PA6,6, HOAc, zinc; ZAA | 438 | | 4.68 | | |
| C11 | Microfiber (no scrim) | PA6,6, HOAc, zinc; ZnSt | 683 | | 3.35 | | |
| C13 | 500BSC Microfiber washed 1X | PA6,6, HOAc, zinc; ZnSt | 507 | | | 3.19 | |
| C14 | Micro washed 10X | PA6,6, HOAc, zinc | 243 | | 2.77 | 2.63 | |
| C15 | Micro washed 20X | PA6,6, HOAc, zinc | 205 | | 1.70 | | |
| C5 | Low viscosity | PA6,6 + Zn-St | 309 | | 3.16 | | |
| C8 | Low viscosity | PA6,6 + Zn-St | 315 | | 2.30 | | |
| D6 | Spunbond 10 gsm | PA6,6 + HOAc + Zn + Cu | 493 | 19.8 | 2.97 | | |
| D7 | Spunbond 20 gsm | PA6,6 + HOAc + Zn + Cu | 471 | 20.1 | 6.10 | | |
| D8 | Spunbond 34 gsm | PA6,6 + HOAc + Zn + Cu | 442 | 18.8 | 3.21 | | |

TABLE 2-continued Polymer Compositions and *Staphylococcus aureus* Efficacy

| # | Sample | Polymer | Zn | Cu | 20743 | E3160 | AATC 100 |
|---|---|---|---|---|---|---|---|
| E1 | SB | PA6,6 + HOAc + Zn + Cu | 508 | 26 | 3.3 | | 8.5 |
| E2 | SB | PA6,6 + HOAc + Zn + Cu | 461 | 20 | 8.55 | | 3 |
| E3 | SB | PA6,6 + HOAc + Zn + Cu | 438 | 19 | 4.6 | | 4.6 |
| E4 | SB | PA6,6 + HOAc + Zn + Cu | 823 | 18 | 3.5 | | 4.4 |
| E5 | SB | PA6,6 + HOAc + Zn + Cu | 724 | 25 | 4.2 | | 4.5 |
| F1 | | 5PA6,6 + TiO2 + zinc | 452 | | 4.20 | | |
| F11 | First Gen. Acteev dyed at NCSU | 500F ZAA | 328 | | 1.14 | | |
| F12 | First Gen. Acteev dyed at NCSU | 500F ZAA | 328 | | 1.14 | | |
| F2 | Socks; scoured | PA6,6 + zinc; ZAA | 464 | | 2.50 | | |
| F3 | Socks scoured | PA6,6, + PA6 + zinc; ZAA | 461 | | 4.40 | | |
| F4 | Socks; scoured; low P | PA6,6 + PA6 + TiO2 + zinc; ZAA | 428 | | 4.30 | | |
| F5 | Knitted; P | PA6,6 + PA6 + TiO2 + zinc; ZAA | 447 | | 7.80 | | |
| F6 | Knitted; P | PA6,6 + PA6 + TiO2 + zinc | 447 | | 7.80 | | |
| F8 | Greige; | PA6,6 + TiO2 + zinc | 375 | | 7.80 | | |
| F9 | Greige; P | PA6,6 + PA6 + TiO2 + zinc | 500 | | 5.70 | | |
| G10 | Yarn/fabric Dyed | PA6,6 + PA6 + TiO2 + zinc | 350 | | 2.48 | | |
| G11 | Yarn/fabric Dyed | PA6,6 + PA6 + TiO2 + zinc | 487 | | 1.98 | | |
| G12 | Yarn/fabric Dyed | PA6,6 + PA6 + TiO2 + zinc | 487 | | 3.81 | | |
| G2 | Yarn/fabric Dyed; P | PA6,6 + PA6 + TiO2 + zinc | 488 | | 6.43 | | |
| G4 | Yarn/fabric Dyed; P | PA6,6 + PA6 + TiO2 + zinc | 510 | | 3.05 | | |
| G5 | Yarn/fabric Dyed; P washed 1X | PA6,6 + PA6 + TiO2 + zinc | 522 | | | 4.38 | |
| G6 | Yarn/fabric Dyed; P washed 25X | PA6,6 + PA6 + TiO2 + zinc | 499 | | 3.55 | | |
| G7 | Yarn/fabric Dyed; P washed 50X | PA6,6 + PA6 + TiO2 + zinc | 505 | | 4.29 | 3.56 | |
| H1 | Spandex 1X Washed | PA6,6 + PA6 + TiO2 + zinc | 454 | | 0.78 | | |
| H2 | Spandex; P | PA6,6 + PA6 + TiO2 + zinc | 431 | | 1.83 | | |
| I1 | Jersey 1X wash; P | PA6,6 + PA6 + TiO2 + zinc | 514 | | 1.60 | | |
| I2 | Jersey 1X wash; P | PA6,6 + PA6 + TiO2 + zinc | 512 | | 5.63 | | |
| J1 | Nanofiber for EPA (short contact times) | PA6,6, HOAc, zinc | #REF! | | 4.7 | | |
| J2 | Microfiber for EPA (short contact times) | PA6,6, HOAc, zinc; ZnSt | 683 | | 3.4 | | |
| K1 | Solution dye | PA6,6 + zinc; ZnSt | 481 | | 1.3 | | |
| K2 | | PA 6,6 + ZnO + adipic (prepol) | 619 | | 2.69 | | |
| L1 | Multi-row; 30 gsm; K | PA6,6, HOAc, zinc | 453 | | 3.05 | | |
| L2 | Multi-row; 18 gsm; K | PA6,6, HOAc, zinc | 455 | | 4.64 | | |
| L4 | Multi-row; 10 gsm; K | PA6,6, HOAc, zinc | 477 | | 3.84 | | |
| L5 | Multi-row; 10 gsm 1X washed; K | PA6,6, HOAc, zinc | 503 | | 3.07 | | |
| L6 | Multi-row; 18 gsm; K | PA6,6, HOAc, zinc | 464 | | 4.12 | | |
| L7 | Multi-row; 18 gsm 1X washed; K | PA6,6, HOAc, zinc | 468 | | 2.96 | | |
| N1 | | PA6,6 + PA6 + Ti02 + zinc | 414 | | 1.70 | | |
| O1 | Dyed (Light Brown) control | PA6,6 + PA6 + TiO2 | 1 | | −0.10 | | |
| O2 | Dyed (Reddish Grey) control | PA6,6 + PA6 + TiO2 | 1 | | −0.20 | | |
| O3 | Dyed (Blue) control | PA6,6 + PA6 + TiO2 | 2 | | −0.20 | | |
| O5 | | 41MA | | | 5.80 | | |
| O7 | Nylon Control Sock | PA6,6 | 0 | | 0.10 | | |
| P1 | PET | PET | 1 | | 0.70 | | |
| Q1 | PET; P | PA6,6 + PA6 + TiO2 + PET | 200 | 0 | 2.03 | | |
| Q2 | PET; P | PA6,6 + PA6 + PET | 8000 | 0 | 5.24 | | |
| Q3 | PET; P | PA6,6 + PA6 + PET | 19000 | 0 | 4.61 | | |
| R2 | Loose yarn | PA6,6, + PA6 + zinc | 495 | 8 | 3.2 | | |
| R4 | Cu/Zn yarn | PA6,6 + zinc + copper | 534 | 486 | 8.4 | | |
| S1 | Zinc Pyrithione | PA6,6 + zinc; Zn pyrit | 739 | | 2.48 | | |

As shown in Table 2, fibers/fabric formed from the polymer compositions described herein demonstrated excellent *Staphylococcus aureus* reduction efficacy. Generally speaking combinations of zinc (and optionally copper) in the disclosed amounts (optionally along with other features) provided for surprisingly high *Staphylococcus aureus* log reductions, e.g., over 0.8, over 2.0, or over 3.0.

*Escherichia coli* results are shown in Table 3.

TABLE 3

Polymer Compositions and *Escherichia coli* Efficacy

| # | Sample | Polymer | Zn | Cu | *Escherichia coli* log red |
|---|---|---|---|---|---|
| A13 | Nano washed 10X | PA6,6, HOAc, zinc | 268 | | 4.71 |
| A14 | 500BSC Nanofiber washed 20X | PA6,6, HOAc, zinc | 190 | | 1.70 |
| A3 | Bright polymer + Zinc Stearate | PA6,6, + PA6 + zinc; Zn-St | 696 | | 4.20 |

TABLE 3-continued

Polymer Compositions and *Escherichia coli* Efficacy

| # | Sample | Polymer | Zn | Cu | *Escherichia coli* log red |
|---|---|---|---|---|---|
| A4 | Bright polymer + Zinc Stearate | PA6,6, + PA6 + zinc; Zn-St | 661 | | 5.10 |
| A7 | Nanofiber | AP6,6 + HOAc + zinc; Zn-St | 500 | | 5.28 |
| A8 | Nanofiber (with scrim) | PA6,6, HOAc, zinc; ZAA | 438 | | 4.48 |
| B1 | PA612 Nano NW | PA612 + ZnO + adip + NH3OH (pre pol) | 620-690 | | 6.87 |
| C11 | Microfiber (no scrim) | PA6,6, HOAc, zinc; ZnSt | 683 | | 7.03 |
| C14 | Micro washed 10X | PA6,6, HOAc, zinc | 243 | | 3.47 |
| C15 | Micro washed 20X | PA6,6, HOAc, zinc | 205 | | 7.15 |
| C5 | Low viscosity | PA6,6 + Zn-St | 309 | | 6.87 |
| C8 | Low viscosity | PA6,6 + Zn-St | 315 | | 6.87 |
| D6 | Spunbond 10 gsm | PA6,6 + HOAc + Zn + Cu | 493 | 19.8 | 6.87 |
| D7 | Spunbond 20 gsm | PA6,6 + HOAc + Zn + Cu | 471 | 20.1 | 6.87 |
| D8 | Spunbond 34 gsm | PA6,6 + HOAc + Zn + Cu | 442 | 18.8 | 6.87 |
| F11 | First Gen. Acteev Fabric dyed at NCSU | 500F | 328 | | 2.82 |
| F12 | First Gen. Acteev Fabric dyed at NCSU | 500F | 328 | | 2.82 |
| F13 | Low P | PA6,6+ TiO2 + zinc; ZAA | 186 | | 1.16 |
| F5 | Knitted; P | PA6,6 + PA6 + TiO2 + zinc; ZAA | 447 | | 7.40 |
| F6 | Knitted; P | PA6,6 + PA6 + TiO2 + zinc | 447 | | 7.40 |
| F8 | Greige; | PA6,6 + TiO2 + zinc | 375 | | 7.40 |
| F9 | Greige; P | PA6,6 + PA6 + TiO2 + zinc | 500 | | 7.40 |
| G10 | Yarn/fabric Dyed | PA6,6 + PA6 + TiO2 + zinc | 350 | | 1.67 |
| G11 | Yarn/fabric Dyed | PA6,6 + PA6 + TiO2 + zinc | 487 | | 7.78 |
| G2 | Yarn/fabric Dyed; P washed 25X | PA6,6 + PA6 + TiO2 + zinc | 499 | | 4.63 |
| G4 | Yarn/fabric Dyed; P washed 50X | PA6,6 + PA6 + TiO2 + zinc | 505 | | 3.78 |
| G6 | Yarn/fabric Dyed; P washed 25X | PA6,6 + PA6 + TiO2 + zinc | 499 | | 7.15 |
| G7 | Yarn/fabric Dyed; P washed 50X | PA6,6 + PA6 + TiO2 + zinc | 505 | | 7.15 |
| H1 | Spandex 1X Washed | PA6,6 + PA6 + TiO2 + zinc | 454 | | 5.7 |
| H2 | Spandex; P | PA6,6 + PA6 + TiO2 + zinc | 431 | | 6.31 |
| I1 | Jersey 1X wash; P | PA6,6 + PA6 + TiO2 + zinc | 514 | | 7.80 |
| I2 | Jersey 1X wash; P | PA6,6 + PA6 + TiO2 + zinc | 512 | | 6.31 |
| K1 | Solution dye | PA6,6 + zinc; ZnSt | 481 | | 2.86 |
| K2 | | PA 6,6 + ZnO + adipic (prepol) | 619 | | 3.55 |
| L1 | Multi-row; 30 gsm; K | PA6,6, HOAc, zinc | 453 | | 4.12 |
| L2 | Multi-row; 18 gsm; K | PA6,6, HOAc, zinc | 455 | | 7.38 |
| L3 | Multi-row; 30 gsm (1X); K | PA6,6, HOAc, zinc | | | |
| L4 | Multi-row; 10 gsm; K | PA6,6, HOAc, zinc | 477 | | 6.31 |
| L5 | Multi-row; 10 gsm 1X washed; K | PA6,6, HOAc, zinc | 503 | | 4.64 |
| L6 | Multi-row; 18 gsm; K | PA6,6, HOAc, zinc | 464 | | 4.60 |
| L7 | Multi-row; 18 gsm 1X washed; K | PA6,6, HOAc, zinc | 468 | | 6.31 |
| N1 | | PA6,6 + PA6 + TiO2 + zinc | 414 | | 2.98 |
| Q1 | PET; P | PA6,6 + PA6 + TiO2 + PET | 200 | | 4.70 |
| Q2 | PET; P | PA6,6 + PA6 + PET | 8000 | | 4.83 |
| Q3 | PET; P | PA6,6 + PA6 + PET | 19000 | | 5.64 |
| R2 | loose yarn | PA6,6, + PA6 + zinc | 495 | 8 | 4.0 |
| R4 | Cu/Zn yarn | PA6,6 + zinc + cop | 534 | 486 | 7.1 |
| S1 | Zinc Pyrithione | PA6,6 + zinc; Zn pyrit | 739 | | 7.23 |

As shown in Table 3, fibers/fabric formed from the polymer compositions described herein demonstrated excellent *Escherichia coli* reduction efficacy. Generally speaking, the combinations of zinc (and optionally copper) in the disclosed amounts (optionally along with other features) provided for surprisingly high *Escherichia coli* log reductions, e.g., over 1.5, over 2.0, or over 3.0.

In addition to the general results, some particular compositions (formulations and/or fibers/fabrics) demonstrated extremely high *Klebsiella pneumonia*, *Staphylococcus*

*aureus*, and/or *Escherichia coli* log reduction efficacy, e.g., particularly synergistic results.

For example, when zinc concentration was kept below 265 ppm and the fiber diameter was kept within a range of from 1 micron to 25 microns, *Klebsiella pneumonia* log reduction efficacy was greater than 1.62 after 10 or 20 wash cycles (see Samples C14 and C15). This demonstrates that specific fiber diameter and lower zinc content unexpectedly led to zinc retention improvement, which in turn provided for surprising efficacy. In comparison, Sample A13 utilized higher zinc content and smaller fiber diameter (nano), but showed good results, but not as good as that of Samples C14 and C15 (1.62 vs. 1.79 and 2.76).

As another example, when zinc concentration (from zinc ammonium adipate) ranged from 425 wppm to 525 wppm (442-493), and copper concentration ranged from 5 wppm to 35 wppm (18-21), and the fibers were spunbond (see Samples D6-D8), efficacy was unexpectedly high—greater than 3.5 (3.51, 3.98, and 4.57). Similarly, spunbond Samples E1-E3 employed from 438 wppm to 508 wppm zinc and from 19 wppm to 26 wppm copper and achieved log reductions from 2.7 to 5.4). In contrast, Sample N1 employed similar amounts of zinc (414 wppm) and no copper in a meltblown process, which resulted in good efficacy (1.32), but not as good as that of Samples D6-D8. Here, the combination of zinc and copper (in the aforementioned amounts) provided for a synergistic effect in the spunbond fibers. Spunbond processing is different from meltblown processing, and these differences, it is postulated, may contribute to the aforementioned efficacy improvements. *Staphylococcus aureus* and *Escherichia coli* efficacy were also surprising and synergistic, as shown in the Tables.

In another unexpected instance, when zinc concentration was kept below 328 wppm (168 wppm) and zinc ammonium adipate was employed in the polymer composition, *Klebsiella pneumonia* log reduction efficacy was greater than 0.93 (see Samples F13). This demonstrates that specific zinc compound and concentration unexpectedly provided for high efficacy. In comparison, Samples F11 and 12 utilized higher zinc content (328) and showed good results, but not as good as that of Sample F13 (1.82 vs. 0.93). It is particularly surprising that Sample F13 performed well for *Klebsiella pneumonia* log reduction (compared to F11 and 12). However, for *Staphylococcus aureus* (1.14 vs 0.83) and *Escherichia coli*, (2.82 vs. 1.16) performance was not as good. For these tests, Samples F11 and F12 actually outperformed Sample F13, which demonstrates Sample 13's unexpected efficacy for *Klebsiella pneumonia*.

In another case, fabrics were prepared then scoured and tested. To make the fabric, fibers made from the disclosed polymer compositions were employed (see Samples F2-4). Zinc concentration ranged from 428 wppm to 464 wppm and zinc ammonium adipate was employed in the polymer composition. *Klebsiella pneumonia* log reduction efficacy for these fabrics (after scouring) was greater than 3.1 (3.1, 3.7, and 4.0). This demonstrates that specific zinc compound and concentration unexpectedly works well with particular fabrics and provides for high efficacy in scoured testing situations. In comparison, Sample G2 utilized higher zinc content (488 wppm) and showed good results after scouring (2.14), but not as good as that of Sample F2-4. Likewise, Comparative Sample 04 employed 5 wppm zinc and a different polymer and performed worse than Samples F2-4.

As another example of specific improvements in performance, intermediate, e.g., griege, fabrics (undyed, before heat set) were prepared. To make the fabrics, fibers made from the disclosed polymer compositions were employed (see Samples F8, and 9). Zinc concentration ranged from 375 wppm to 500 wppm. The greige (and knitted) and fabrics were produced by known methods. *Klebsiella pneumonia* log reduction efficacy for these fabrics tested and was found to be greater than 2.2 (5.0, and 5.2). This demonstrates that specific concentration unexpectedly works well with particular griege fabrics (and/or knitted) and provides for high efficacy in *Klebsiella pneumonia* log reduction efficacy testing. In comparison, Sample G2 utilized higher zinc content (488 wppm) and showed good results after scouring (2.14). Other similar samples performed much better, e.g., Sample F2-4, 5, 6, 8, and 9. The data also show that although both knitted and greige fabrics demonstrate good results, the same formulation works even better for griege fabrics than for others (compare 5.00 and 5.20 for greige vs. 3.3 for knitted or 3.1, 3.7, and 4.0 for socks (F2-4). *Staphylococcus aureus* efficacy were also surprising and synergistic, as shown in the Tables. Some of these were equally beneficial for knitted fabrics, see F5 and F7.

Additionally, certain combinations perform particularly well after multiple wash cycles. Samples G4, 6, and 7 employed zinc concentrations ranging from 499 wppm to 510 wppm. In these cases, zinc retention unexpectedly improved as the number of washes increased—499 wppm after 25 washes vs. 505 wppm for 50 washes. *Klebsiella pneumonia* log reduction efficacy was greater than 2.87 (2.87, 3.34, and 6.07 for Samples G4, 6, and 7). This demonstrates that specific zinc compound and concentration polymer mixture, e.g., PA6,6 and PA6, and low phosphorus content unexpectedly provided for high efficacy. Sample G2 utilized slightly less zinc (488 wppm) and showed good results (2.14), G4, 6, and 7, showed surprisingly good results as well—2.87+vs. 2.14.

As another example, various processes features were employed to produce the fibers/fabrics. In one case, a multi-row die was employed for the meltblown process, see Samples L1-7, which employed zinc concentrations ranging from 414 wppm to 503 wppm. The dies were used to produce fabric weights ranging from 10 gsm to 30 gsm. *Klebsiella pneumonia* log reduction efficacy was particularly high, e.g., greater than 2.39 (3.28, 3.76, 2.39, 2.86, 4.47, 2.89, and 3.27 for Samples L1-7). The use of the aforementioned zinc concentration allows the disclosed polymer compositions to be utilized in with many production equipment options to make fibers having varying diameters and coat weights. Beneficially, the use of the multi-row die (along with the disclosed polymer formulations) provides for the benefits of increasing production rate, at least in part due to the properties of the described polymer composition, such as its RV, while still achieving the accompanying antiviral performance. *Staphylococcus aureus* and *Escherichia coli* efficacy were also surprising and synergistic, as shown in the Tables.

In some cases, the aforementioned zinc (and other metal) compounds and concentrations allow for flexibility in polymer selection, which provides for a synergistic combination of the aforementioned antiviral/antimicrobial benefits along with physical, mechanical, or heat aging performance. Many additional polymers, e.g., PET, are known to present challenges when combining with nylon. Challenges also exist for other nylons, e.g., long chain polyamides such as PA 10, PA 12, PA 6,10 and/or PA 6,12. It has also been found difficult to obtain a consistent dispersion of zinc in such polymers and polymer mixtures.

For example, Sample B1 utilized combinations of PA 6,6 with PA 6,12 and various zinc content ranging from 620 wppm to 690 wppm. The resultant fibers demonstrated

*Klebsiella pneumonia* log reduction efficacy of 3.64. In addition to the superior efficacy, these fibers unexpectedly were able be successfully processed/produced and surprisingly had a synergistic combination of *Klebsiella pneumonia* efficacy and mechanical performance.

In some instances, the zinc compound may be employed in a masterbatch, and, optionally, with a second polymer, e.g., PET. Samples Q2 and 3 employed polyamide, PET, and higher concentrations of zinc compound, e.g., zinc oxide. When used in this manner, fibers were still able to be effectively produced. And the resultant fibers demonstrated unexpected *Staphylococcus aureus* and *Escherichia coli* log reduction efficacy.

In some cases, yarns may be formed, and the yarns may demonstrate surprising results. Samples R2 and 4 employed polymer compositions comprising a polymer blend of PA6,6 and PA6 and 495 wppm and 534 wppm zinc along with 8 wppm and 486 wppm copper. Yarns were prepared from the polymer compositions using known methods. Samples R2 and R4 effectively yielded yarns, and the yarns demonstrated *Klebsiella pneumonia* log reduction efficacy of 2.1 and 5.7, respectively. The combination was particularly effective in forming yarns. In particular, when the weight ratio of zinc to copper was limited, efficacy synergistically improved—compare R2 (ratio of 61:1) vs. R4 (ratio of 1.1), 2.1 vs. 5.7. The improvement of R4 is an unexpected increase, especially in view of the performance of high zinc content sample A3 (~700 wppm zinc)—2.70. *Staphylococcus aureus* and *Escherichia coli* efficacy were also surprising and synergistic, as shown in Tables 2 and 3.

For example, for Samples C5 and C8, when zinc concentration was kept at a low level (309 wppm and 315 wppm) and zinc stearate is used as the zinc compound, and viscosity was kept low using a low viscosity polymer (RV less than 50), *Staphylococcus aureus* log reduction efficacy was greater than 1.15 (2.30 and 3.16). This demonstrates that particular zinc compound, specific polymer properties and lower zinc content unexpectedly led to surprising efficacy, especially in microfibers. In comparison, Samples F11 and F12 utilized similar zinc content (328 wppm) but a different zinc compound and a higher viscosity polymer, and showed good results, but not as good as that of Samples C5 and C8 (1.14 vs. 2.30 and 3.16). The difference was even more stark when *Escherichia coli* performance was assessed (2.82 vs. 6.87).

In another instance, the zinc compound may be employed in a masterbatch, and, optionally, with a second polymer, e.g., PET. Samples Q2 and 3 employed polyamide, PET, and higher concentrations of zinc compound, e.g., zinc oxide. When used in this manner, fibers were still able to be effectively produced. And the resultant fibers demonstrated *Staphylococcus aureus* log reduction efficacy greater than 2.1 (5.24 and 4.61). In contrast, a similar formulation Q1 using much lower amounts of zinc (200 wppm) and the same polymer combination, performed well, but not as well as Q2 and Q3 (2.03 vs. 5.24 and 4.61)

Examples 1-4: Antimicrobial Activity

To assess the antimicrobial activity of the polymer compositions described herein, the following non-limiting examples were carried out.

Several samples of exemplary polymer compositions were prepared using a polymer and a zinc compound, as shown in Table 4A. The base polymer included nylon-6,6. In some samples, the polymer composition comprised an additional component. The nylon-6,6 polymer of each sample was made by a batch process, in which nylon-6,6 salt was processed in an evaporator to achieve the desired concentration, and then polymerized in an autoclave using a typical four step process. The zinc component (and any additional component) was added to the salt solution in an evaporation step before polymerization. The polymer compositions were then used to form fibers/fabrics by melt blowing (for nonwovens) or by spinning the polymer composition, drawing, and texturing (for knit fabrics). The composition and form of each sample is reported in Table 4A below.

TABLE 4A

Sample Compositions

| Example | Polymer | Zinc Compound | Content | Addtl. Compounds Compound | Content | Form |
|---|---|---|---|---|---|---|
| 1 | Nylon-6,6 | Zinc ammonium adipate | 164 ppm | $TiO_2$ Caprolactam | 1.6 wt. % 1.75 wt. % | Knit fabric |
| 2 | Nylon-6,6 | Zinc ammonium adipate | 250 ppm | $TiO_2$ Caprolactam | 1.6 wt. % 1.75 wt. % | Knit fabric |
| 3 | Nylon-6,6 | Zinc ammonium adipate | 347 ppm | $TiO_2$ Caprolactam | 1.6 wt. % 1.75 wt. % | Knit fabric |
| 4 | Nylon-6,6 | Zinc ammonium adipate | 463 ppm | $TiO_2$ Caprolactam | 1.6 wt. % 1.75 wt. % | Knit fabric |

The samples were tested for antimicrobial efficacy (*Klebsiella pneumoniae* and *S. aureus*) according to ISO20743:2013. Each sample was tested three times. The results are shown in Table 4B. The results in Table 4B (and Table 4C below) are reported as log reduction, which is the base 10 logarithm of the ratio of the initial microbe count to the final microbe count.

TABLE 4B

Antimicrobial Activity

| Example | Test 1 | Test 2 | Test 3 | Avg. |
|---|---|---|---|---|
| *Klebisella pneumoniae* (log reduction) | | | | |
| 1 | 0.00 | 1.57 | 2.09 | 1.22 |
| 2 | 2.30 | 1.61 | 4.28 | 2.73 |
| 3 | 2.80 | 2.93 | 6.16 | 3.96 |
| 4 | 3.40 | 8.34 | 6.16 | 5.97 |
| *Staphylococcus aureus* (log reduction) | | | | |
| 1 | 2.3 | 3.25 | 2.14 | 2.56 |
| 2 | 1.9 | 2.61 | 2.95 | 2.49 |
| 3 | 1.5 | 2.10 | 4.83 | 2.81 |
| 4 | 2.7 | 3.41 | 4.83 | 3.65 |

As the table shows, the polymer compositions demonstrate excellent antimicrobial activity. In particular, as the zinc content increases, e.g., past 200 wppm, the antimicrobial activity (particularly with respect to *K. pneumoniae*) increases.

To further assess the antimicrobial activity, the samples were tested for antimicrobial efficacy according to ASTM E3610-18. Each sample was tested three times. The results are shown in Table 4C.

TABLE 4C

Antimicrobial Activity

| | ASTM E3610-18 (log reduction) | | | |
|---|---|---|---|---|
| Example | Test 1 | Test 2 | Test 3 | Avg. |
| 1 | 0.12 | 4.67 | 0.8 | 1.87 |
| 2 | 1.78 | 4.18 | 6.21 | 4.06 |
| 3 | 2.57 | 5.65 | 6.21 | 4.81 |
| 4 | 1.78 | 7.42 | 6.21 | 5.14 |

As the table shows, the polymer compositions demonstrate excellent antimicrobial activity. In particular, as the zinc content increases, the antimicrobial activity increases.

Example 5-8: Zinc Retention Rate

In addition to the antimicrobial/antiviral properties, the disclosed compositions surprisingly demonstrated improved zinc retention after washing (washfastness) of the polymer.

Several additional examples were prepared as noted above. The composition and form of each sample is reported in Table 5A below.

TABLE 5A

Sample Compositions

| | | Zinc | | Addtl. Compounds | | |
|---|---|---|---|---|---|---|
| Example | Polymer | Compound(s) | Content | Compound | Content | Form |
| 5 | Nylon-6,6 | Zinc stearate | 315 ppm | Acetic acid | 600 ppm | Nonwoven, melt blown |
| 6 | Nylon-6,6 | Zinc stearate | 309 ppm | Acetic acid | 600 ppm | Nonwoven, melt blown |
| 7 | Nylon-6,6 | Zinc stearate, zinc ammonium adipate | 676 ppm | | | Nonwoven, melt blown |
| 8 | Nylon-6,6 | Zinc stearate, zinc ammonium adipate | 688 ppm | | | Nonwoven, melt blown |

The samples were subjects to multiple wash cycles. After several wash cycles, the zinc content of the sample was measured. The retention rate was calculated by comparison to the unwashed zinc content. The results are shown in Table 5B.

TABLE 5B

Sample Compositions

| | Unwashed | After Five Washes | | After Ten Washes | |
|---|---|---|---|---|---|
| Example | Content | Content | Retention | Content | Retention |
| 5 | 315 ppm | 282 ppm | 90% | 259 | 82% |
| 6 | 309 ppm | 298 ppm | 96% | 223 | 72% |
| 7 | 676 ppm | 671 ppm | 99% | 656 | 97% |
| 8 | 688 ppm | 675 ppm | 98% | 636 | 92% |

As the table shows, the polymer compositions demonstrate excellent washfastness, in many cases retaining over 80% of the zinc even after 10 washes.

Embodiments

As used below, any reference to a series of embodiments is to be understood as a reference to each of those embodiments disjunctively (e.g., "Embodiments 1-4" is to be understood as "Embodiments 1, 2, 3, or 4").

Embodiment 1 is a polymer composition having permanent antiviral properties, the composition comprising: from 50 wt. % to 99.9 wt. % of a polymer, from 1 wppm to 30,000 wppm of zinc, optionally from a zinc compound, and less than 1 wt. % of a phosphorus compound, wherein the polymer composition demonstrates antiviral properties, and wherein the polymer is hydrophilic and/or hygroscopic.

Embodiment 2 is a polymer composition having permanent antiviral properties comprising: a polymer; less than 30,000 ppm of zinc dispersed within the polymer; and less than 10,000 ppm of phosphorus; wherein the weight ratio of the zinc to the phosphorus is: at least 1.3:1; or less than 0.64:1; wherein the polymer composition demonstrates antiviral properties; and wherein the polymer is hydrophilic and/or hygroscopic, e.g., a nylon-based polymer, such as PA-4T/41; PA-4T/6I; PA-5T/5I; PA-6; PA-6,6; PA-6,6/6; long chain polyamide (such as PA-10; PA-12; PA-6,10; PA-6,12, as well as other known long chain variants optionally including aromatic components, e.g., T and I components); PA-6,6/6T; PA-6T/6I; PA-6T/6I/6; PA-6T/6; PA-6T/6I/66; PA-6T/MPMDT (where MPMDT is polyamide based on a mixture of hexamethylene diamine and 2-methylpentamethylene diamine as the diamine component and terephthalic acid as the diacid component); PA-6T/66; PA-6T/610; PA-10T/612; PA-10T/106; PA-6T/612; PA-6T/10T; PA-6T/10I; PA-9T; PA-10T; PA-12T; PA-10T/10I; PA-10T/12; PA-10T/11; PA-6T/9T; PA-6T/12T; PA-6T/10T/6I; PA-6T/6I/6; PA-6T/6I/12; and copolymers, blends, and/or mixtures, and/or other combinations thereof.

Embodiment 3 is the polymer composition of embodiment(s) 1 or 2, at least a portion of the zinc is in ionic form.

Embodiment 4 is the polymer composition according to any of the previous embodiments, wherein the hydrophilic and/or hygroscopic polymer is capable of absorbing greater than 1.5 wt. % water, based on the total weight of the polymer.

Embodiment 5 is the polymer composition according to any of the previous embodiments, wherein the polymer composition has zinc retention rate greater than 65%.

Embodiment 6 is the polymer composition according to any of the previous embodiments, further comprising from 5 wppm to 20,000 wppm of a copper compound.

Embodiment 7 is the polymer composition according to any of the previous embodiments, further comprising from 5 wppm to 20,000 wppm of a silver compound.

Embodiment 8 is the polymer composition according to any of the previous embodiments, further comprising a hygroscopic material.

Embodiment 9 is the polymer composition according to any of the previous embodiments, wherein the polymer comprises a functional endgroup modification to increase hygroscopy.

Embodiment 10 is the polymer composition according to any of the previous embodiments, wherein the antiviral properties comprise limiting, reducing, or inhibiting infection and/or pathogenesis of a virus.

Embodiment 11 is the polymer composition according to any of the previous embodiments, wherein the polymer composition has permanent antimicrobial properties.

Embodiment 12 is the polymer composition according to any of the previous embodiments, wherein the polymer composition further comprises an additional antiviral agent, optionally comprising an entry inhibitor, a reverse transcriptase inhibitor, a DNA polymerase inhibitor, an m-RNA synthesis inhibitor, a protease inhibitor, an integrase inhibitor, or an immunomodulator, or combinations thereof.

Embodiment 13 is the polymer composition according to any of the previous embodiments, wherein the virus is an adenovirus, a herpesvirus, a poxvirus, a rhinovirus, a coxsackievirus, an enterovirus, a morbillivirus, a coronavirus, an influenza A virus, an avian influenza virus, a swine-origin influenza virus, or an equine influence virus.

Embodiment 14 is the polymer composition according to any of the previous embodiments, wherein the molar ratio of the phosphorus compound to the zinc compound is at least 0.01:1.

Embodiment 15 is the polymer composition according to any of the previous embodiments, wherein the polymer composition has a relative viscosity of at least 10.

Embodiment 16 is the polymer composition according to any of the previous embodiments, further comprising a delusterant comprising a titanium compound.

Embodiment 17 is the polymer composition according to any of the previous embodiments, wherein the delusterant is present in an amount less than 2.0 wt. %.

Embodiment 18 is the polymer composition of embodiment(s) 6, wherein the copper compound comprises copper iodide, copper bromide, copper chloride, copper fluoride, copper oxide, copper stearate, copper ammonium adipate, copper acetate, or copper pyrithione, or combinations thereof.

Embodiment 19 is the polymer composition according to any of the previous embodiments, wherein the phosphorus compound comprises benzene phosphinic acid, phosphorous acid, or manganese hypophosphite, or combinations thereof.

Embodiment 20 is the polymer composition according to any of the previous embodiments, wherein the zinc compound comprises zinc oxide, zinc stearate, zinc ammonium adipate, zinc acetate, or zinc pyrithione, or combinations thereof.

Embodiment 21 is the polymer composition according to any of the previous embodiments, wherein the zinc compound comprises zinc oxide.

Embodiment 22 is the polymer composition according to any of the previous embodiments, wherein the zinc compound comprises zinc oxide and wherein the polymer composition has a relative viscosity of at least 10.

Embodiment 23 is the polymer composition according to any of the previous embodiments, wherein the zinc compound comprises zinc oxide, zinc stearate, zinc pyrithione, or zinc ammonium adipate, or combinations thereof, wherein the phosphorus compound comprises benzene phosphinic acid; wherein the molar ratio of the phosphorus to the zinc ranges from 0.01:1 to 3:1; wherein the polymer composition has a relative viscosity of greater than 10.

Embodiment 24 is the polymer composition according to any of the previous embodiments, wherein the polymer comprises polyethylene, polypropylene, polyethylene terephthalate, polyethylene terephthalate glycol, co-PET, polylactic acid, polytrimethylene terephthalate, long chain polyamide, PA-4T/41, PA-4T/6I, PA-5T/5I, PA-6, PA-6,6, PA-6, 6/6, PA-6,6/6T, PA-6T/6I, PA-6T/6I/6, PA-6T/6, PA-6T/6I/66, PA-6T/MPMDT, PA-6T/66, PA-6T/610, PA-10T/612, PA-10T/106, PA-6T/612, PA-6T/10T, PA-6T/10I, PA-9T, PA-10T, PA-12T, PA-10T/10I, PA-10T/12, PA-10T/11, PA-6T/9T, PA-6T/12T, PA-6T/10T/6I, PA-6T/6I/6, PA-6T/61/12, low-density polyethylene (LLDPE), low-density polyethylene (LDPE), medium-density polyethylene (MDPE), high-density polyethylene (HDPE), ultra-high-molecular-weight polyethylene (UHMWPE), polycarbonate, polycarbonate and acrylonitrile butadiene styrene (PC-ABS), a blend of polycarbonate and polyvinyl toluene (PC-PVT), a blend of polycarbonate and polybutylene terephthalate (PC-PBT), a blend of polycarbonate and polyethylene terephthalate (PC-PET), and copolymers, blends, mixtures and/or other combinations thereof.

Embodiment 25 is a polymer composition having permanent antiviral properties, the composition comprising: from 50 wt. % to 99.9 wt. % of a polymer, from 5 wppm to 20,000 wppm of a copper compound, and less than 1 wt. % of a phosphorus compound, wherein fibers and/or fabric formed from the polymer composition demonstrate antiviral properties.

Embodiment 26 is the polymer composition of embodiment(s) 25, wherein the antiviral properties comprise limiting, reducing, or inhibiting infection and/or pathogenesis of a virus.

Embodiment 27 is the polymer composition according to any of embodiment(s) 25-26, wherein the virus is an adenovirus, a herpesvirus, a poxvirus, a rhinovirus, a coxsackievirus, an enterovirus, a morbillivirus, a coronavirus, an influenza A virus, an avian influenza virus, a swine-origin influenza virus, or an equine influence virus.

Embodiment 28 is the polymer composition according to any of embodiment(s) 25-27, wherein the copper compound comprises copper iodide, copper bromide, copper chloride, copper fluoride, copper oxide, copper stearate, copper ammonium adipate, copper acetate, or copper pyrithione, or combinations thereof.

Embodiment 29 is the polymer composition according to any of embodiment(s) 25-28, further comprising less than 30,000 wppm of a zinc compound.

Embodiment 30 is a fiber or a fabric formed from the polymer composition according to any of embodiment(s) 1-29.

Embodiment 31 is a nonwoven polymer structure formed from nonwoven fibers of the polymer composition according to any of embodiment(s) 1-29.

Embodiment 32 is the nonwoven polymer structure of embodiment(s) 31, wherein the structure is formed via melt spinning or melt blowing.

Embodiment 33 is the nonwoven polymer structure of embodiment(s) 31, wherein the structure is formed via solution spinning.

Embodiment 34 is the nonwoven polymer structure of embodiment(s) 31, wherein the structure is formed via spunbonding.

Embodiment 35 is the nonwoven polymer structure of any of embodiment(s) 31-34, wherein the nonwoven fibers have an average fiber diameter of less than 25 microns.

Embodiment 36 is the nonwoven polymer structure of any of embodiment(s) 31-35, wherein less than 20% of the fibers have a diameter of greater than 700 nanometers.

Embodiment 37 is a mask comprising one or more layers of the nonwoven polymer structure of any of embodiment(s) 31-36.

Embodiment 38 is the mask of embodiment(s) 37, comprising two or more layers of the nonwoven polymer structure.

Embodiment 39 is the mask of any of embodiment(s) 37-38, further comprising a fiber and/or fabric formed from the polymer composition according to any of embodiment(s) 1-29.

Embodiment 40 is the mask of any of embodiment(s) 37-39, wherein the polymer comprises nylon.

Embodiment 41 is a medical product or device comprising the nonwoven polymer structure of any of embodiment(s) 31-36.

Embodiment 42 is a molded article formed from the polymer composition according to any of embodiment(s) 1-29.

Embodiment 43 is a reusable fabric article formed from the polymer composition according to any of embodiment(s) 1-29.

Embodiment 44 is a filter comprising: a layer of a fiber and/or a fabric formed from the polymer composition according to any of embodiment(s) 1-29.

Embodiment 45 is a medical product or device comprising: a fiber and/or a fabric formed from the polymer composition according to any of embodiment(s) 1-29.

Embodiment 46 is the medical product or device of embodiment(s) 45, wherein the medical product or device is reusable.

Embodiment 47 is the medical product or device of embodiment(s) 45 or 46, wherein the medical product or device is a mask, wipe, gown, towel, protective clothing, or protective net.

Embodiment 48 is a layered structure comprising: an antiviral nonwoven layer comprising the polymer composition of any of embodiment(s) 1-29; and an additional layer; wherein the structure demonstrates antiviral properties.

Embodiment 49 is the layered structure of embodiment(s) 48, wherein the antiviral properties comprise limiting, reducing, or inhibiting infection and/or pathogenesis of a virus.

Embodiment 50 is the layered structure of embodiment(s) 48, wherein the polymer composition further comprises an additional antiviral agent, optionally comprising an entry inhibitor, a reverse transcriptase inhibitor, a DNA polymerase inhibitor, an m-RNA synthesis inhibitor, a protease inhibitor, an integrase inhibitor, or an immunomodulator, or combinations thereof.

Embodiment 51 is the layered structure of embodiment(s) 8, wherein the additional layer comprises a microfiber layer and/or a nanofiber.

Embodiment 52 is a polymer composition having antimicrobial properties, the composition comprising: from 50 wt % to 99.99 wt % of a polymer, from 10 wppm to 900 wppm (10-823) of zinc, less than 1000 wppm of phosphorus, less than 10 wppm coupling agent and/or surfactant, wherein zinc is dispersed within the polymer; and wherein fibers formed from the polymer composition demonstrate a *Klebsiella pneumonia* log reduction greater than 0.90, as determined via ISO20743:2013 and/or an *Escherichia coli* log reduction greater than 1.5, as determined via ASTM E3160 (2018).

Embodiment 53 is an embodiment of embodiment 52 wherein the polymer has an amine end group content less than 55.

Embodiment 54 is an embodiment of embodiment 52 or 53 wherein the composition comprises greater than 200 ppm zinc.

Embodiment 55 is an embodiment of any of embodiments 52-54 wherein the polymer comprises from 600 wppm to 700 wppm of zinc.

Embodiment 56 is an embodiment of any of embodiments 52-55 wherein the polymer comprises from 275 wppm to 350 wppm of zinc provided via zinc stearate.

Embodiment 57 is an embodiment of any of embodiments 52-56 wherein the polymer comprises less than 250 wppm phosphorus.

Embodiment 58 is an embodiment of any of embodiments 52-57 wherein the polymer has a relative viscosity less than 75.

Embodiment 59 is an embodiment of any of embodiments 52-58 wherein the polymer is hydrophilic and/or hygroscopic, and is capable of absorbing greater than 1.5 wt % water, based on the total weight of the polymer.

Embodiment 60 is an embodiment of any of embodiments 52-59 wherein the polymer comprises PA6, or PA 6,6, or combinations thereof.

Embodiment 61 is an embodiment of any of embodiments 52-60 wherein the polymer comprises a second polymer.

Embodiment 62 is an embodiment of any of embodiments 52-61 wherein the zinc is provided from a zinc compound comprising zinc oxide, zinc stearate, zinc ammonium adipate, zinc acetate, or zinc pyrithione, or combinations thereof.

Embodiment 63 is an embodiment that is fibers produced using of any of embodiments 52-62.

Embodiment 64 is an embodiment that is a medical product or device comprising fibers or fabric produced of any of embodiments 52-62, wherein the medical product or device is reusable.

Embodiment 65 is an embodiment of any of embodiments 52-61 wherein the composition comprises zinc provided via zinc stearate.

Embodiment 66 is polymer fibers having antimicrobial reduction efficacy, the fibers comprising: from 50 wt % to 99.99 wt % of a polymer, less than 328 wppm (186) of zinc, less than 1 wt % of phosphorus, less than 10 wppm coupling agent and/or surfactant, wherein the fibers demonstrate a *Escherichia coli* log reduction less than 2.82, as determined via ISO20743 (year).

Embodiment 67 is an embodiment of embodiment 66 wherein the fibers comprise less than 268 wppm (205,243) of zinc.

Embodiment 68 is an embodiment of embodiment 66 or 67 wherein the fibers have an average fiber diameter ranging from 1 micron to 25 microns; and wherein the fibers demonstrate a *Klebsiella pneumonia* log reduction greater than 1.2, as determined via ISO20743 (year).

Embodiment 69 is spunbond polymer fibers having antimicrobial properties, the fibers comprising: from 50 wt % to 99.99 wt % of a polymer, 425 wppm to 600 wppm of zinc, 5 wppm to 35 wppm copper, less than 1 wt % of phosphorus, less than 10 wppm coupling agent and/or surfactant, wherein the fibers demonstrate a *Klebsiella pneumonia* log reduction greater than 2.7, as determined via ISO20743 (year).

Embodiment 70 is an embodiment of embodiment 69 wherein the polymer has a relative viscosity ranging from 5 to 70 and wherein the fibers have an average fiber diameter ranging from 1 micron to 25 microns.

Embodiment 71 is a mask comprising a spunbond layer comprising the polymer fibers of an embodiment of embodiment 69 or 70.

Embodiment 72 is a fabric comprising polymer fibers having *Klebsiella pneumonia* reduction efficacy, the fibers comprising: from 50 wt % to 99.99 wt % of a polymer, from 350 wppm to 600 wppm of zinc (from ZAA), and less than 1 wt % of phosphorus, less than 10 wppm coupling agent and/or surfactant, wherein the fibers demonstrate a *Klebsiella pneumonia* log reduction greater than 2.15, after scouring, as determined via ISO20743:2013.

Embodiment 73 is an embodiment of embodiment 72 wherein the fabric is a knitted fabric or a greige fabric and wherein the fibers comprise from 350 wppm to 550 wppm of zinc, and wherein the fibers demonstrate a *Klebsiella pneumonia* log reduction greater than 3.3, as determined via ISO20743:2013.

Embodiment 74 is an embodiment of embodiment 72 or 73 wherein the fibers comprise from 350 wppm to 550 wppm of zinc and wherein the fabric has a coat weight ranging from 1 gsm to 50 gsm.

Embodiment 75 is an embodiment of embodiment 72-74 wherein the fibers are produced using a multi-row die.

Embodiment 76 is polymer fibers having *Klebsiella pneumonia* reduction efficacy, the fibers comprising: from 50 wt % to 99.99 wt % of a polymer, 480 wppm to 520 wppm of zinc, and less than 1 wt % of phosphorus, less than 10 wppm coupling agent and/or surfactant, wherein the fibers demonstrate a *Klebsiella pneumonia* log reduction greater than 2.14, as determined via ISO20743 (year).

Embodiment 77 is a polymer composition having antimicrobial properties, the composition comprising: a polyamide polymer; an olefin polymer; from 5000 wppm to 20000 wppm of zinc, and less than 1 wt % of phosphorus, less than 10 wppm coupling agent and/or surfactant, wherein zinc is dispersed within the polymer; and wherein fibers formed from the polymer composition demonstrate a *Klebsiella pneumonia* log reduction greater than 1.41, as determined via ISO20743 (year) and/or a *Staphylococcus aureus* log reduction greater than 2.1, as determined via ISO20743 (year).

Embodiment 78 is a polymer yarn having antimicrobial properties, the yarn comprising fibers comprising: from 50 wt % to 99.99 wt % of a polymer, 425 wppm to 600 wppm of zinc, 1 wppm to 525 wppm copper, less than 1 wt % of phosphorus, less than 10 wppm coupling agent and/or surfactant, wherein the fibers demonstrate a *Klebsiella pneumonia* log reduction greater than 2.1, as determined via ISO20743 (year), and optionally wherein the weight ratio of zinc to copper is less than 60:1.

We claim:

1. A polymer composition having antimicrobial properties, the composition consisting of:
   from 50 wt % to 99.99 wt % of a polymer,
   from 200 wppm to 900 wppm of zinc,
   phosphorus,
   from 0 wppm to 10 wppm coupling agent and/or surfactant,
   from 0 wt. % to 3 wt. % of additives selected from the group consisting of delusterants, pigments, colored materials, and flame retardants,
   wherein the polymer has a relative viscosity less than 75;
   wherein zinc is dispersed within the polymer;
   wherein the polymer has an amine end group content less than 55; and
   wherein fibers formed from the polymer composition demonstrate a *Klebsiella pneumonia* log reduction greater than 0.90, as determined via ISO20743:2013 and/or an *Escherichia coli* log reduction greater than 1.5, as determined via ASTM E3160 (2018).

2. The polymer composition of claim 1, wherein the polymer comprises from 600 wppm to 700 wppm of zinc.

3. The polymer composition of claim 1, wherein the polymer comprises from 275 wppm to 350 wppm of zinc provided via zinc stearate.

4. The polymer composition of claim 1, wherein the polymer comprises less than 250 wppm phosphorus.

5. The polymer composition of claim 1, wherein the polymer is hydrophilic and/or hygroscopic, and is capable of absorbing greater than 1.5 wt % water, based on the total weight of the polymer.

6. The polymer composition of claim 1, wherein the polymer comprises PA6, or PA 6,6, or combinations thereof.

7. The polymer composition of claim 1, wherein the polymer comprises a first polymer and a second polymer.

8. The polymer composition of claim 1, wherein the zinc is provided from a zinc compound comprising zinc oxide, zinc stearate, zinc ammonium adipate, zinc acetate, or zinc pyrithione, or combinations thereof.

9. Fibers or fabric produced using the polymer composition of claim 1.

10. A medical product or device comprising fibers or fabric produced using the polymer composition of claim 1, wherein the medical product or device is reusable.

11. The polymer composition of claim 1, wherein the composition comprises zinc provided via zinc stearate.

12. Polymer fibers having antimicrobial reduction efficacy, the fibers consisting of:
    from 50 wt % to 99.99 wt % of a polymer,
    from 200 wppm to 328 wppm of zinc provided via zinc ammonium adipate, phosphorus,
    from 0 to 10 wppm coupling agent and/or surfactant,
    from 0 wt. % to 3 wt. % of additives selected from the group consisting of delusterants, pigments, colored materials, and flame retardants,
    wherein the polymer has a relative viscosity less than 75; and
    wherein the fibers demonstrate a *Klebsiella pneumonia* log reduction greater than 0.93, as determined via ISO20743:2013, after at least 10 wash cycles; and wherein the fibers demonstrate an *Escherichia coli* log reduction greater than 1.5, as determined via ASTM E3160 (2018).

13. The fibers of claim 12, wherein the fibers comprise less than 268 wppm of zinc.

14. The fibers of claim 12, wherein the fibers have an average fiber diameter ranging from 1 micron to 25 microns; and wherein the fibers demonstrate a *Klebsiella pneumonia* log reduction greater than 1.2, as determined via ISO20743:2013.

15. Spunbond polymer fibers having antimicrobial properties, the fibers consisting of:
    from 50 wt % to 99.99 wt % of a polymer,
    425 wppm to 600 wppm of zinc provided via zinc stearate, zinc oxide, zinc ammonium adipate, zinc acetate, or zinc pyrithione, or combinations thereof,
    5 wppm to 35 wppm copper provided via copper iodide, copper bromide, copper chloride, copper fluoride, copper stearate, copper ammonium adipate, copper phenyl phosphinic acid, copper acetate, or copper pyrithione, or combinations thereof,
    phosphorus,
    from 0 to 10 wppm coupling agent and/or surfactant, and
    from 0 wt. % to 3 wt. % of additives selected from the group consisting of delusterants, pigments, colored materials, anti-odor additives, flame retardants, and UV additives,
    wherein the polymer has a relative viscosity ranging from 5 to 70; and wherein the fibers demonstrate a *Klebsiella pneumonia* log reduction greater than 2.7, as determined via ISO20743:2013.

16. The fibers of claim 15, wherein the fibers have an average fiber diameter ranging from 1 micron to 25 microns.

17. A mask comprising a spunbond layer comprising the polymer fibers of claim 15.

18. A fabric comprising polymer fibers having *Klebsiella pneumonia* reduction efficacy, the fibers consisting of:
from 50 wt % to 99.99 wt % of a polymer,
from 350 wppm to 600 wppm of zinc,
phosphorus,
from 0 to 10 wppm coupling agent and/or surfactant, and
from 0 wt. % to 3 wt. % of additives selected from the group consisting of delusterants, pigments, colored materials, and flame retardants,
wherein the polymer has a relative viscosity less than 75;
wherein the polymer has an amine end group content less than 55; and
wherein the fibers demonstrate a *Klebsiella pneumonia* log reduction greater than 3.10, after scouring, as determined via ISO20743:2013.

19. The fabric of claim 18, wherein the fabric is a knitted fabric or a greige fabric and wherein the fibers comprise from 350 wppm to 550 wppm of zinc, and wherein the fibers demonstrate a *Klebsiella pneumonia* log reduction greater than 3.3, as determined via ISO20743:2013.

20. The fabric of claim 18, wherein the fibers comprise from 350 wppm to 550 wppm of zinc and wherein the fabric has a coat weight ranging from 1 gsm to 50 gsm.

21. The fabric of claim 18, wherein the fibers are produced using a multi-row die.

22. Polymer fibers having *Klebsiella pneumonia* reduction efficacy, the fibers consisting of:
from 50 wt % to 99.99 wt % of a polymer,
480 wppm to 520 wppm of zinc,
phosphorus,
from 0 to 10 wppm coupling agent and/or surfactant, and
from 0 wt. % to 3 wt. % of additives selected from the group consisting of delusterants, pigments, colored materials, and flame retardants,
wherein the polymer has a relative viscosity less than 75;
wherein the polymer has an amine end group content less than 55; and
wherein the fibers demonstrate a *Klebsiella pneumonia* log reduction greater than 2.14, as determined via ISO20743:2013.

23. A polymer composition having antimicrobial properties, the composition consisting of:
a polyamide polymer;
polyethylene terephthalate;
from 5000 wppm to 20000 wppm of zinc provided via zinc stearate, zinc oxide, zinc ammonium adipate, zinc acetate, or zinc pyrithione, or combinations thereof,
phosphorus, and
from 0 to 10 wppm coupling agent and/or surfactant,
from 0 wt. % to 3 wt. % of additives selected from the group consisting of delusterants, pigments, colored materials, and flame retardants,
wherein zinc is dispersed within the polymer;
wherein the polymer has a relative viscosity less than 75; and
wherein fibers formed from the polymer composition demonstrate a *Klebsiella pneumonia* log reduction greater than 1.41, as determined via ISO20743:2013 and/or a *Staphylococcus aureus* log reduction greater than 2.1, as determined via ISO20743:2013.

24. A polymer yarn having antimicrobial properties, the yarn comprising fibers consisting of:
from 50 wt % to 99.99 wt % of a polymer,
425 wppm to 600 wppm of zinc provided via zinc stearate, zinc oxide, zinc ammonium adipate, zinc acetate, or zinc pyrithione, or combinations thereof,
1 wppm to 525 wppm copper provided via copper iodide, copper bromide, copper chloride, copper fluoride, copper stearate, copper ammonium adipate, copper phenyl phosphinic acid, copper acetate, or copper pyrithione, or combinations thereof,
phosphorus, and
from 0 to 10 wppm coupling agent and/or surfactant,
from 0 wt. % to 3 wt. % of additives selected from the group consisting of delusterants, pigments, colored materials, anti-odor additives, flame retardants, and UV additives,
wherein the polymer has a relative viscosity ranging from 5 to 70;
wherein the fibers demonstrate a *Klebsiella pneumonia* log reduction greater than 2.1, as determined via ISO20743:2013, and optionally
wherein the weight ratio of zinc to copper is less than 60:1.

25. The polymer composition of claim 1, wherein the polymer composition comprises greater than 50 wppm and less than 1000 wppm phosphorus.

26. The polymer fibers of claim 12, wherein the polymer fibers comprise greater than 50 wppm and less than 10000 wppm phosphorus.

27. The spunbond polymer fibers of claim 15, wherein the spunbond polymer fibers comprise greater than 50 wppm and less than 10000 wppm phosphorus.

28. The fabric of claim 18, wherein the polymer fibers comprise greater than 50 wppm and less than 10000 wppm phosphorus.

29. The polymer fibers of claim 22, wherein the polymer comprises greater than 50 wppm and less than 500 wppm phosphorus.

30. The polymer composition of claim 23, wherein the polymer composition comprises greater than 50 wppm and less than 10000 wppm phosphorus.

31. The polymer yarn of claim 24, wherein the fibers comprise greater than 50 wppm and less than 10000 wppm of phosphorus.

* * * * *